(12) United States Patent
Wiese et al.

(10) Patent No.: US 8,226,829 B2
(45) Date of Patent: Jul. 24, 2012

(54) METHOD FOR SEPARATING ORGANIC TRANSITION METAL COMPLEX CATALYSTS

(75) Inventors: Klaus-Diether Wiese, Haltern am See (DE); Goetz Baumgarten, Haltern am See (DE); Franz-Felix Kuppinger, Marl (DE); Oliver Moeller, Oer-Erkenschwick (DE); Dagmara Ortmann, Brig-Glis (CH); Cornelia Borgmann, Frankfurt (DE); Wilfried Bueschken, Haltern am See (DE)

(73) Assignee: Evonik Oxeno GmbH, Marl (DE)

( * ) Notice: Subject to any disclaimer, the term of this patent is extended or adjusted under 35 U.S.C. 154(b) by 493 days.

(21) Appl. No.: 12/088,041

(22) PCT Filed: Sep. 8, 2006

(86) PCT No.: PCT/EP2006/066181
§ 371 (c)(1),
(2), (4) Date: Mar. 25, 2008

(87) PCT Pub. No.: WO2007/036424
PCT Pub. Date: Apr. 5, 2007

(65) Prior Publication Data
US 2008/0251456 A1    Oct. 16, 2008

(30) Foreign Application Priority Data
Sep. 27, 2005  (DE) .................. 10 2005 046 250

(51) Int. Cl.
*B01D 63/00* (2006.01)
*C07C 47/00* (2006.01)

(52) U.S. Cl. .............. 210/651; 210/652; 210/195.2; 568/451; 568/454; 568/909; 568/426

(58) Field of Classification Search .............. 210/640, 210/651, 170, 180, 195.2, 652, 650; 203/50; 568/451, 454, 909, 429, 426
See application file for complete search history.

(56) References Cited

U.S. PATENT DOCUMENTS

| 5,731,472 | A  |   | 3/1998  | Leung et al. |         |
|-----------|----|---|---------|--------------|---------|
| 6,090,987 | A  | * | 7/2000  | Billig et al. | 568/454 |
| 6,153,800 | A  | * | 11/2000 | Gelling et al. | 568/454 |
| 6,310,261 | B1 | * | 10/2001 | Geissler et al. | 568/454 |
| 6,610,891 | B1 | * | 8/2003  | O'Young et al. | 568/451 |

(Continued)

FOREIGN PATENT DOCUMENTS
WO        93 04029        3/1993
(Continued)

OTHER PUBLICATIONS
U.S. Appl. No. 11/574,018, filed Feb. 21, 2007, Borgmann, et al.
(Continued)

*Primary Examiner* — Ana Fortuna
(74) *Attorney, Agent, or Firm* — Oblon, Spivak, McClelland, Maier & Neustadt, L.L.P.

(57) ABSTRACT

Process for separating a dissolved complex catalyst of a metal of group 4, 5, 6, 7, 8, 9 or 10 of the Periodic Table of the Elements and/or any free organophosphorus ligand present from a nonaqueous hydroformylation reaction mixture which contains an aldehyde product and an organic solvent at least one membrane which is more permeable to the hydroformylation product than to the organophosphorus ligand, the separation being carried out under a carbon monoxide partial vapor pressure of more than 200 kPa.

25 Claims, 4 Drawing Sheets

U.S. PATENT DOCUMENTS

| | | | |
|---|---|---|---|
| 7,012,162 B2 * | 3/2006 | Mackewitz et al. | 568/454 |
| 7,026,523 B2 | 4/2006 | Röttger et al. | |
| 7,353,316 B2 * | 4/2008 | Erdmann | 710/316 |
| 7,495,133 B2 * | 2/2009 | Borgmann et al. | 568/451 |
| 2005/0240039 A1 | 10/2005 | Rottger et al. | |
| 2007/0213574 A1 | 9/2007 | Borgmann et al. | |
| 2008/0021234 A1 | 1/2008 | Nierlich et al. | |

FOREIGN PATENT DOCUMENTS

WO    94 19104    9/1994

OTHER PUBLICATIONS

U.S. Appl. No. 12/159,957, filed Jul. 2, 2008, Baumgarten, et al.

U.S. Appl. No. 13/203,295, filed Aug. 25, 2011, Priske, et al.

* cited by examiner

METHOD FOR SEPARATING ORGANIC TRANSITION METAL COMPLEX CATALYSTS

The present invention relates to a process for separating organic transition metal complex catalysts, in particular rhodium complex catalysts, from reaction mixtures in which these catalysts are present in solution.

The use of homogeneous rhodium complex catalysts in various processes of industrial organic chemistry has long been known. In particular, the use of rhodium-phosphine, -phosphite, -phosphonite or -phosphinite complexes in processes for the hydroformylation of olefins is adequately known. However, these processes have not become more widespread. This is presumably due to the relatively expensive catalysts and the difficulties experienced in separating these very completely from the reaction mixtures again.

The separation of the catalyst from the reaction mixture can in the simplest way be carried out by thermal separation processes in which the reaction product is separated from the catalyst-containing reaction mixture by evaporation. A disadvantage of this separation process is that the reaction mixture has to be exposed to relatively high temperatures without the presence of the stabilizing synthesis gas and under such conditions the phosphorus-containing ligands used can be destroyed.

To overcome these problems, it has been proposed a number of times that the rhodium catalyst be separated off not by means of thermal processes but by use of a membrane process.

WO 94/19104 proposes the use of a membrane for separating noble metal catalysts from hydroformylation mixtures. In this process, the complex catalyst is separated off at temperatures of from 75 to 100° C. After leaving the reactor, the reaction mixture is depressurized so that the partial vapor pressure of hydrogen and carbon monoxide does not exceed 1 atm in each case. The intention of the depressurization is to produce a situation where the ligands present in the complex catalyst are essentially the phosphorus-containing ligands and thus to ensure that the complex catalyst is retained by the membrane.

EP 0 781 166 describes the separation of a dissolved rhodium-organophosphite complex catalyst and free ligand from a nonaqueous hydroformylation reaction mixture at a membrane, with at least 90% by mass of the catalyst and the free ligand being separated off at the membrane. Such a high degree of separation is achieved by use of a membrane which is selected so as to be matched precisely to the products to be separated from one another. Such a process has the disadvantage that new membranes have to be selected whenever changes in the compositions occur so as to be able to achieve the high degree of retention. The process can be carried out at a temperature of less than 150° C. and a pressure of from 344.5 kPa (3.445 bar) to 10 MPa (100 bar). It can be seen from the examples that the pressure of the reaction mixture fed to the membrane is increased by pressurization with nitrogen. The pressure on the permeate side of the membrane corresponds to atmospheric pressure.

In EP 1 232 008, the process of EP 0 781 166 is adopted and used for the removal of high boilers from the catalyst recycle stream. To prevent blocking of the membrane by the high boilers to be separated off, a diluent is added before the recycle stream is supplied to the membrane to ensure that the concentration of high boilers in the stream fed to the membrane is less than or equal to 50% by weight. The addition of diluent is a disadvantage, because the amount of material passed over the membrane is increased. This process can be carried out at a temperature of from 10 to 50° C. and a pressure of from 0.1 to 10 MPa. In this process, the reaction product of the hydroformylation is firstly freed of the gaseous reactants by depressurization and of the reaction products by means of a thermal separation process before the residual stream which remains is fed to the membrane process.

A disadvantage of the processes known from the prior art is the decrease in activity of the catalyst which frequently occurs, so that a decrease in the activity of the catalyst is observed despite effective separation of the rhodium from the reaction mixture. As a result of the clustering of the rhodium to form finely divided particles, in particular, the rhodium can be separated off even by microfiltration (0.45 μm). In the processes of the prior art, no distinction is made between dissolved rhodium-ligand catalyst system and very finely divided clustered, metallic rhodium. As a result, the rhodium complex catalyst retentions suggested are considerably better than can actually be achieved by the processes of the prior art. This clustering is demonstrated indirectly in the interpretation of the results of Example 2 of WO 01/37993. In the case of a completely soluble catalyst-ligand complex and a given system yield Φ of 0.923 (concentration factor=13; specific gravity of permeate=specific gravity of concentrate) and a rhodium retention R of 0.924 (R=1−[Rh] in permeate/[Rh] in concentrate), the total concentration of rhodium in the concentrate would have to be, according to $R_{tot}=1-(1-(1-\Phi)\exp(1-R)/(\Phi))=0.81$ at the given concentration factor of 13, given approximately by 13×0.81×171 ppm=1801 ppm. The actual value is only 1255 ppm. It is obvious to presume that clustering and precipitation on the walls of the experimental plant is the cause of the low value found. In practice, this result means an unacceptable loss of active, dissolved catalyst-ligand system.

Starting out from this prior art, it was an object of the present invention to provide a process in which one or more of the disadvantages mentioned do not occur. A process by means of which the transition metal complex catalyst can be separated off very completely without the occurrence of clustering (for the purposes of the present invention, clustering is the formation of compounds having at least four metal atoms) and with a very small decrease in activity should preferably be provided.

It has surprisingly been found that a transition metal complex catalyst can be separated very substantially from a hydroformylation reaction mixture and the activity of the transition metal catalyst can be very largely maintained when the transition metal catalyst is separated off at a membrane under conditions under which carbon monoxide is still present in the system in a stoichiometric amount based on the catalyst-ligand complex. This is achieved by the hydroformylation reaction mixture still having, if desired after partial depressurization and partial degassing, a carbon monoxide gas pressure of at least 200 kPa (2 bar), preferably 1 MPa (10 bar) or more, on the retentate and permeate side of the membrane. The transmembrane pressure of at least 1 MPa (10 bar) or more required for the membrane process is set by means of the permeate-side admission pressure of the liquid. This finding is particularly surprising because it was stated in WO 94/19104 that the rhodium complex catalyst can be separated off only with difficulty when synthesis gas is present in the feed to the membrane.

The present invention accordingly provides a process for separating a dissolved complex catalyst of a metal of group 4, 5, 6, 7, 8, 9 or 10 of the Periodic Table of the Elements which has an organophosphorus ligand from a nonaqueous hydroformylation reaction mixture which contains a hydroformylation product and an organic solvent, the process having at least one membrane separation step in which at least one membrane which is more permeable to the hydroformylation product than to the organophosphorus ligand is used, wherein the hydroformylation reaction mixture is supplied to a membrane in the membrane separation step, the membrane separation step being carried out at a carbon monoxide partial vapor pressure of at least 200 kPa in the flow to the membrane, in the flow from the membrane and in the permeate.

For the purposes of the present invention, nonaqueous reaction mixtures are mixtures which contain no water or contain only such a small amount of water that no separate aqueous phase is formed. If water is present, only such an amount of water which can dissolve homogeneously in the organic phase is present. For the purposes of the present invention, the partial vapor pressure is the partial pressure as defined in Römpp Lexikon Chemie—Version 2.0, Stuttgart/ New York: Georg Thieme Verlag 1999.

The process of the invention has the advantage that the activity of the catalyst which has been separated off is very largely retained and clustering of the rhodium is very largely counteracted. When rhodium complex catalysts are used, this is possibly due to conditions which in terms of the synthesis gas pressure differ significantly from the hydroformylation conditions resulting in the formation of rhodium clusters which are no longer soluble and cannot be brought back into solution and activated by means of a simple change in the conditions. Although these Rh clusters can likewise be retained by the membrane in processes of the prior art, which is why the catalyst can be separated off very well according to the prior art, the catalyst which has been separated off has a significantly poorer activity or no activity at all.

A further advantage of the process is that the combination of at least one first membrane separation step with at least one thermal separation step and, if desired, at least one further membrane separation step makes it possible to achieve a system retention of >98% based on the catalyst ligand complex. Only in such a combination is virtually quantitative recovery of the catalyst with simultaneous product recovery and minimization of the amount of high boilers possible. The thermal separation allows the catalyst to be separated off without damage, in particular at low concentrations, even without stabilizing synthesis gas. These favorable, low concentrations in the thermal stage combined with advantageously high catalyst complex concentrations in the reactor are for the first time made economically possible by the upstream membrane system.

Small residual amounts of catalyst and high boilers may still be present in the bottom from the above-described thermal separation step. To remove the high boiler, a downstream nanofiltration in which less than 10% of the amount of feed is separated off as permeate can be inserted at this point. It can ensure that a hydroformylation mixture (permeate) having a catalyst concentration which has been reduced still further can be discharged.

In the process of the invention for separating a dissolved complex catalyst of a metal of group 4, 5, 6, 7, 8, 9 or 10 of the Periodic Table of the Elements which has an organophosphorus ligand from a nonaqueous hydroformylation reaction mixture which contains a hydroformylation product and an organic solvent, the process having at least one membrane separation step in which at least one membrane which is more permeable to the hydroformylation product than to the organophosphorus ligand is used, the hydroformylation reaction mixture is supplied to a membrane in the membrane separation step, the membrane separation step being carried out at a carbon monoxide partial vapor pressure of at least 200 kPa, preferably at least 400 kPa, particularly preferably from 400 to 8000 kPa and particularly preferably from 500 to 1000 kPa, in the flow to the membrane, in the flow from the membrane and in the permeate. It is important that the carbon monoxide partial vapor pressure is at least 200 kPa both in the flow to the membrane and also in the flow from the membrane and in the permeate.

In hydroformylation, synthesis gas (a mixture of hydrogen and carbon monoxide, preferably an approximately equimolar mixture) is usually used as one starting material. The synthesis gas is usually used in excess. Without complete depressurization or degassing, the reaction product mixture from the hydroformylation reactor therefore generally contains enough carbon monoxide to ensure the required carbon monoxide partial vapor pressure in the membrane separation step. However, should it be necessary, it is possible to feed in additional carbon monoxide to increase the carbon monoxide partial vapor pressure. The carbon monoxide partial vapor pressure can be determined, for example, by gas analysis and measurement of the total pressure of the gas phase.

In addition to the carbon monoxide, hydrogen (from the synthesis gas) can also be present in the reaction mixture and its partial vapor pressure is in the same order of magnitude as that of the carbon monoxide. The hydrogen partial vapor pressure is particularly preferably greater than 200 kPa (2 bar).

The process of the invention can be carried out using one, two or more membranes or using one, two or more membrane separation steps. Depending on the separation performance of the membrane and the desired retention, the desired retention can be achieved by arranging a plurality of membrane separation steps in series. In particular, two or more membrane separation steps can be carried out in the process of the invention. The membrane separation steps can be carried out in direct succession. However, it can be advantageous for, for example, thermal separation steps to be carried out between membrane separation steps and only part of the reaction mixture obtained in the thermal separation step to be fed to the subsequent membrane separation step. The connection in series can be configured so that either the retentate or the permeate, preferably the permeate, of a first membrane separation step is passed as feed stream to a further membrane separation step. The membrane separation steps which may follow the first membrane separation step according to the invention can likewise be carried out under conditions similar to those in the first. One membrane or a plurality of membranes can be used in a membrane separation step. Preference is given to using two or more membranes in a membrane separation step.

In the process of the invention, the upper temperature limit in the membrane separation steps is determined by the stability of the membranes used and the stability of the catalyst system. The separation of the material at the membrane is preferably carried out at a temperature which is the same as or lower than that in the hydroformylation. In the process of the invention, preference is given to carrying out a membrane separation step, in particular the first membrane separation step, at a temperature of from 20 to 150° C., particularly preferably at a temperature of from 30 to 140° C. and very particularly preferably at a temperature of from 50 to 125° C. If hydroformylation reaction mixtures obtained in the hydroformylation of $C_{12}$-olefins are used for separating off catalyst from hydroformylation reaction mixtures in the process of the invention, the membrane step, in particular the first membrane step, is preferably carried out at a temperature of from 100 to 125° C. If hydroformylation reaction mixtures obtained in the hydroformylation of $C_8$-olefins are used for separating off catalyst from hydroformylation reaction mixtures in the process of the invention, the membrane step, in particular the first membrane step, is preferably carried out at a temperature of from 50 to 70° C. Carrying out the separation according to the invention at the preferred temperatures can, firstly, result in a higher flux through the membrane. Secondly, adhering to the abovementioned preferred temperature ranges slows or avoids decomposition of the catalyst which can otherwise lead to losses of active catalyst and to deposition of decomposition products of the catalyst on the membrane. Deposits can reduce the mass flow through the membrane, and in extreme cases the mass flow can be completely stopped due to blockage.

The transmembrane pressure (pressure at the membrane between retentate side and permeate side) at which the separation according to the invention in the membrane step is preferably carried out is preferably at least 1 MPa, preferably from 1 to 10 MPa and particularly preferably from 2 to 4 MPa.

The total pressure at which the separation in the membrane separation step, in particular the first membrane separation step (membrane separation step before any thermal separation step is carried out), can be greater than, equal to or less than the pressure in the hydroformylation reactor. The pressure is preferably less than in the hydroformylation reactor. The pressure at which the hydroformylation reaction mixture is fed to the membrane preferably corresponds to from 90 to 100% or from 60 to 90% or from 40 to 60% or less than 40% of the pressure in the hydroformylation reactor, with the proviso that the partial vapor pressure of carbon monoxide is at least 200 kPa (2 bar). If hydroformylation reaction mixtures obtained in the hydroformylation of $C_{12}$-olefins are used for separating off catalyst from hydroformylation reaction mixtures in the process of the invention, the pressure at which the hydroformylation reaction mixture is fed to the membrane is preferably less than 40% of the pressure in the hydroformylation reactor. If hydroformylation reaction mixtures obtained in the hydroformylation of $C_8$-olefins are used for separating off catalyst from hydroformylation reaction mixtures in the process of the invention, the pressure at which the hydroformylation reaction mixture is fed to the membrane is preferably from 60 to 100% of the pressure in the hydroformylation reactor.

The process is particularly preferably carried out so that the membrane separation step, in particular the first membrane separation step, is carried out at the same pressure and, if appropriate, the same temperature as in the hydroformylation reactor.

In the process of the invention, it is possible to use membranes which, owing to their chemical or physical properties, are suitable for retaining organophosphorus metal complex catalyst and/or free organophosphorus ligand to an extent of preferably at least 50%. A further prerequisite for the usability of the membrane is that the membrane has to be stable towards all compounds present in the hydroformylation reaction mixture, in particular towards the solvents. Preference is given to membranes which comprise a separation-active layer composed of a material selected from among cellulose acetate, cellulose triacetate, cellulose nitrate, regenerated cellulose, polyimides, polyamides, polyether ether ketones, aromatic polyamides, polyamidimides, polybenzimidazoles, polybenzimidazolones, polyacrylonitrile, polyaryl ether sulfones, polyesters, polycarbonates, polytetrafluoroethylene, polyvinylidene fluoride, polypropylene, polydimethylsiloxane (PDMS), polyether ether ketone (PEEK), acrylonitrile/glycidyl methacrylate (PANGMA), silane-hydrophobicized ceramic membranes as described in DE 103 08 111, polymers having intrinsic microporosity (PIM) and others as are described, for example, in EP 0 781 166 and in "Membranes" by I. Cabasso, Encyclopedia of Polymer Science and Technology, John Wiley and Sons, New York, 1987, or consist of these materials. Particular preference is given to using membranes which comprise, as separation-active layer, a polymer layer composed of polydimethylsiloxane (PDMS), polyimide (PI), polyamidimide (PAI), acrylonitrile/glycidyl methacrylate (PANGMA), polyamide (PA) or polyether ether ketone (PEEK), this is made up of polymers having intrinsic microporosity (PIM) or in which the separation-active layer is built up over a hydrophobicized ceramic membrane. Very particular preference is given to using membranes composed of PDMS or polyamidimide. Such membranes can be procured from, for example, GMT, Rheinfelden (DE) or Solsep, Apeldoorn (NL). Apart from the abovementioned materials, the membranes can comprise further materials. In particular, the membranes can have support or carrier materials onto which the separation-active layer is applied. In the case of such composite membranes, a support material is present in addition to the actual membrane. A selection of support materials is described in EP 0 781 166, which is explicitly incorporated by reference. Furthermore, reinforcing materials such as particles of inorganic oxides or inorganic fibers, e.g. ceramic or glass fibers, which increase the stability of the membranes, in particular to pressure fluctuations or high pressure differences, can be present in the membrane to be used according to the invention.

In the process of the invention, preference is given to using membranes which are permeable to molecules having a molar mass up to 1000 g/mol, preferably to molecules having a molar mass up to 900 g/mol and very particularly preferably to molecules having a molar mass up to 500 g/mol. Such membranes are obtainable from, for example, Solsep or MET under the trade names Solsep 010606 or Starmem 240.

Membranes in the case of which the solubility parameters of the hydroformylation product, in particular the aldehyde, differs by at least ±50 $\sqrt{(kJ/m^3)}$, preferably by at least ±50 $\sqrt{(kJ/m^3)}$, but preferably by not more than ±500 $\sqrt{(kJ/m^3)}$, preferably by not more than ±400 $\sqrt{(kJ/m^3)}$, from the solubility parameter of the membrane used are particularly preferably used in the process of the invention.

The molecular volume ratio of the organophosphorus ligands (free or bound in the complex) to the hydroformylation products, in particular the aldehydes, should preferably be greater than or equal to 1.5, more preferably greater than or equal to 3.0 and particularly preferably greater than or equal to 3.5. As a result of the large molar volume difference, particularly good separation of ligand and hydroformylation product at the membrane is achieved. The solubility parameters and molecular volumes can be determined as described in EP 0 781 166 B1, in particular in the paragraphs [0053] onwards, and in the references cited therein.

In the process of the invention, the membranes are preferably used in the form of membrane modules. In these modules, the membranes are arranged so that the reaction mixture can be passed over the retentate side of the membrane in such a way that the concentration polarization of the components separated off, here catalyst-ligand system, is counteracted and, in addition, the necessary driving force (pressure) can be applied. The permeate is combined in the permeate collection space on the permeate side of the membrane and discharged from the module. Customary membrane modules have membranes in the form of membrane disks, membrane cushions or membrane pockets. In the process of the invention, the membranes are preferably used in the form of membrane modules having open-channeled cushion module systems in which the membranes are thermally welded or adhesively bonded to form membrane pockets or cushions or open-channeled (wide-spacer) rolled modules in which the membranes are adhesively bonded or welded to form membrane pockets or membrane cushions and are rolled up together with feed spacers around a permeate collection tube. Membrane modules which have open-channeled inflow systems in which the membranes are thermally welded or adhesively bonded to form membrane pockets or membrane cushions are available, for example, from Solsep, Apeldoorn (NL) and MET, London (UK) under the name SR-5 or Starmem 240. Such membranes can be produced, for example, from the polyimide having the trade name P84 from Degussa AG, Düsseldorf.

To avoid deposits on the membrane, the process is preferably carried out so that the flow velocity over the membrane in the membrane separation step, in particular the first membrane separation step, is from 0.1 to 15 m/sec, preferably from 0.2 to 4 m/sec, more preferably from 0.3 to 1 m/sec.

The process of the invention is preferably operated with the hydroformylation reaction mixture from the reactor being supplied as feed stream to the membrane and the retentate stream being partly recirculated to the membrane. Here, the substream which is recirculated to the membrane is combined beforehand with the stream from the reactor. The part of the retentate stream which is not recirculated to the membrane is either used as feed stream for one or more subsequent separation stages or else is recirculated to the reaction.

The volume flow ratio of permeate stream to feed stream from the reactor (without recirculated retentate) is preferably from 1:5 to 1:20, more preferably from 1:7.5 to 1:12.5 and particularly preferably from 1:9 to 1:11. Adjustment of the volume flow ratio by changing the individual system yields can be carried out by adaptation of the differential pressure and the ratio of permeate volume flow to volume of feed stream.

It can be advantageous for the volume flow over the membrane to be significantly greater than the volume flow of the permeate stream, since a high flow velocity over the membrane can be achieved in this simple way. The volume flow ratio of the stream fed to the membrane, in particular to the first membrane of the first membrane separation step (inflow from the reactor including recirculated retentate) to permeate stream is preferably 10-10 000:1, more preferably 50-5000:1 and particularly preferably 200-2000:1. Thus, a relatively large volume stream is preferably circulated over the membrane. The size of the part of the retentate stream which is recirculated to the reaction or fed to a further separation is given by the difference between feed stream (without recirculated retentate) and permeate stream.

The permeate obtained at the membrane preferably has a composition in which the proportion of metal complex catalyst and/or free organophosphorus ligand is at least 50%, preferably at least 75%, particularly preferably at least 85% and very particularly preferably 90%, smaller than in the retentate.

The permeate which is obtained from the membrane separation step in the process of the present invention can be worked up in a conventional way. Particular preference is given to carrying out a thermal separation step to separate off the hydroformylation product subsequent to a membrane separation step. Such a thermal separation step can, for example, be realized by means of one or more thermal separation apparatuses such as thin film evaporators, falling film evaporators, flash evaporators or distillation columns. The overhead product obtained usually comprises the hydroformylation product, e.g. aldehyde and/or alcohol, and any unreacted hydrocarbons, e.g. olefins or aliphatics, and any solvent having a boiling point in the region of that of the hydroformylation products or below which is used in the hydroformylation and can be passed to a further work-up. The bottom product obtained from the thermal separation step is a mixture containing the complex catalyst and/or free ligands, any solvent having a boiling point higher than that of the hydroformylation product and also high boilers formed during the hydroformylation.

This bottom product can, preferably after discharge of part of the high boilers which can be carried out thermally or by means of a (membrane) filtration, be recirculated to the hydroformylation reactor. The bottom product from the thermal separation step, which comprises high boilers and catalyst complex, is preferably fed to a further membrane step in which part of the high boilers is separated off from the bottom product as permeate and the catalyst complex remaining in the retentate is at least partly recirculated to the reactor. In this separation, the same conditions in respect of temperature and partial vapor pressures of carbon monoxide and/or hydrogen as in the first membrane separation can be set. For this purpose, it can be necessary to inject a gas or a gas mixture. The membrane separation can optionally also be carried out without introduction of gas. As a result of complex catalyst and/or free ligand being separated off in a coupled fashion in a first membrane separation step and in a subsequent thermal separation step, the catalyst can be separated virtually completely from the hydroformylation reaction mixture and the major part of it can be recirculated in the active form to the process. Any inactive catalyst formed in the thermal separation can be discharged together with the high boilers and be recovered by, for example, work-up to rhodium metal. The total retention of complex catalyst and/or free ligand in the process of the invention comprising at least one first membrane separation step, at least one thermal separation step and, if desired, at least one subsequent membrane separation step is preferably more than 98%.

It can be advantageous for part of the constituents of the permeate to be removed therefrom before it is fed to the thermal separation stage. In particular, it can be advantageous to separate constituents which are gaseous under the pressure conditions under which the thermal separation stage is operated from the permeate. Such constituents can be, in particular, hydrogen and carbon monoxide and possibly hydrocarbons. To separate off these constituents, the permeate is preferably introduced into a degassing stage in which the permeate is depressurized to a lower pressure, preferably a pressure which is equal to or not more than 10% higher than the pressure in the thermal separation stage. The substances which are in gaseous form after depressurization are separated off and can be worked up or disposed of or else be recirculated directly to the reaction. The remaining, still liquid constituents of the permeate are then fed to the thermal separation stage.

The hydroformylation reaction mixture used in the process of the invention can originate from a variety of known hydroformylation processes. The hydroformylation reaction mixtures can originate from processes for the hydroformylation of olefins, preferably olefins having from 2 to 25 carbon atoms, particularly preferably from 4 to 16 carbon atoms, very particularly preferably from 6 to 12 carbon atoms and in particular 8, 9, 10, 11 or 12 carbon atoms, to the corresponding aldehydes. The hydroformylation reaction mixture very particularly preferably has an aldehyde selected from among aldehydes having from 5 to 17 carbon atoms, preferably 9 or 13 carbon atoms, in particular isononanal and isotridecanal, as hydroformylation product.

The complex catalysts and/or free organophosphorus ligands present in the hydroformylation reaction mixture can be the compounds and complexes known from the prior art.

The complex catalysts or the free ligands preferably comprise ligands selected from among phosphines, phosphites, phosphinites, phosphonites. The ligands can have one or more phosphino, phosphito, phosphonito or phosphinito groups. It is likewise possible for the ligands to have two or more different groups selected from among phosphino, phosphito, phosphonito and phosphinito groups. In particular, the ligands can be bisphosphites, bisphosphines, bisphosphonites, bisphosphinites, phosphine-phosphites, phosphine-phosphonites, phosphine-phosphinites, phosphite-phosphonites, phosphite-phosphinites or phosphonite-phosphinites. The ligands of the complex catalyst and the free ligands can be identical or different. The organophosphorus ligands of the complex catalysts and the free ligands are preferably identical. Examples of complex catalysts or ligands which can be used and their preparation and use in hydroformylation may be found in, for example, EP 0 213 639, EP 0 214 622, EP 0 155 508, EP 0 781 166, EP 1209164, EP 1201675, DE 10114868, DE 10140083, DE 10140086, DE 10210918 or WO 2003/078444, which are expressly incorporated by reference.

EXAMPLES OF PREFERRED LIGANDS ARE phosphines: triphenylphosphine, tris(p-tolyl)phosphine, tris(m-tolyl)phosphine, tris(o-tolyl)-phosphine, tris(p-methoxyphenyl)phosphine, tris(p-dimethylaminophenyl)phosphine, tricyclohexylphosphine, tricyclopentylphosphine, triethylphosphine, tri-(1-naphthyl)phosphine, tribenzylphosphine, tri-n-butylphosphine, tri-tert-butylphosphine.

Phosphites: trimethyl phosphite, triethyl phosphite, tri-n-propyl phosphite, tri-1-propyl phosphite, tri-n-butyl phosphite, tri-1-butyl phosphite, tri-tert-butyl phosphite, tris(2-ethylhexyl) phosphite, triphenyl phosphite, tris(2,4-di-tert-butylphenyl) phosphite, tris(2-tert-butyl-4-methoxyphenyl) phosphite, tris(2-tert-butyl-4-methylphenyl) phosphite, tris(p-cresyl) phosphite.

Phosphonites: methyldiethoxyphosphine, phenyldimethoxyphosphine, phenyldiphenoxyphosphine, 2-phenoxy-2H-dibenz[c,e][1,2]oxaphosphorin and derivatives thereof in which the hydrogen atoms are completely or partly replaced by alkyl and/or aryl radicals or halogen atoms.

Useful phosphinite ligands are diphenyl(phenoxy)phosphine and derivatives thereof, diphenyl(methoxy)phosphine and diphenyl(ethoxy)phosphine.

Hydroformylation reaction mixtures used according to the invention particularly preferably have an acyl phosphite or heteroacyl phosphite or a ligand having an acyl or heteroacyl phosphite group as organophosphorus ligand. Acyl phosphites or ligands having acyl phosphite groups, their preparation and their use in hydroformylation are described, for example, in DE 100 53 272, which is incorporated by reference into the disclosure of the present invention. Heteroacyl phosphites and ligands having heteroacyl phosphite groups, their preparation and their use in hydroformylation are described, for example, in DE 10 2004 013 514.

Among the acyl phosphites described in DE 100 53 272, the acyl phosphites shown below, in particular, are particularly preferred organophosphorus ligands which can be present as complexed ligand and/or as free ligand in a hydroformylation reaction mixture used according to the invention.

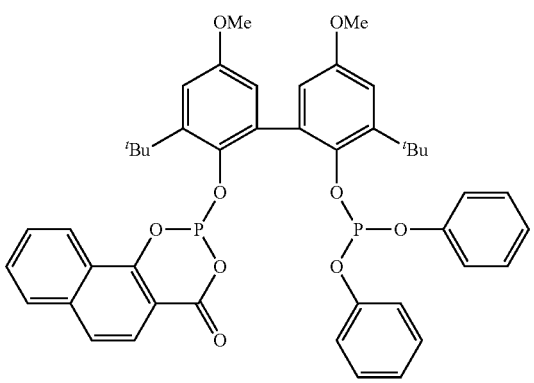

1-a

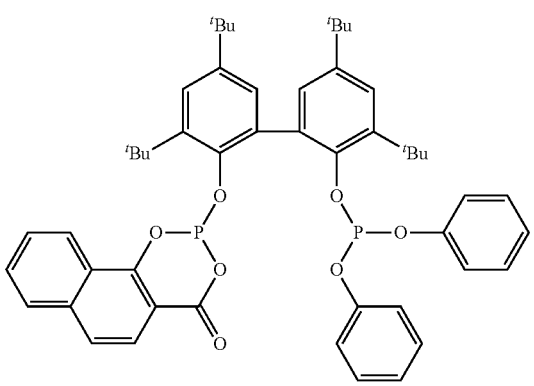

1-b 2-a

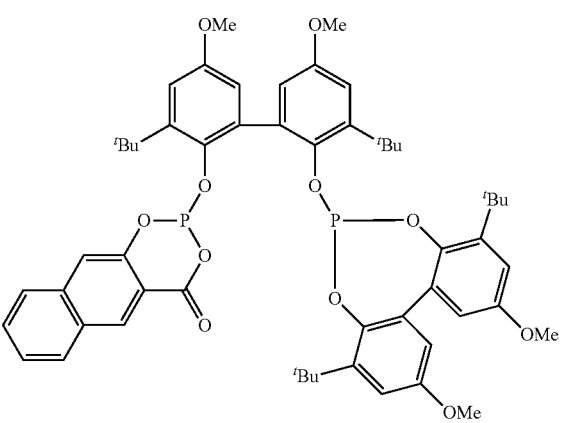

2-b

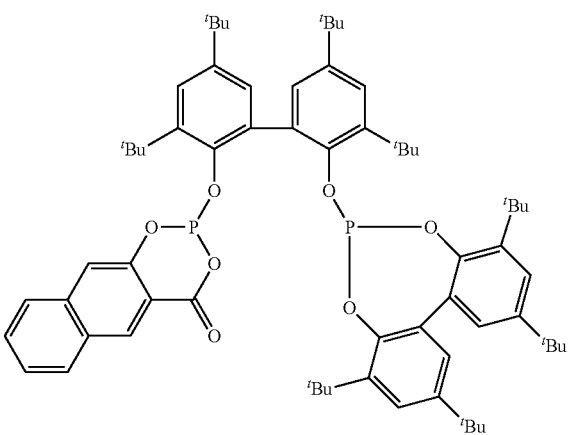

3-a
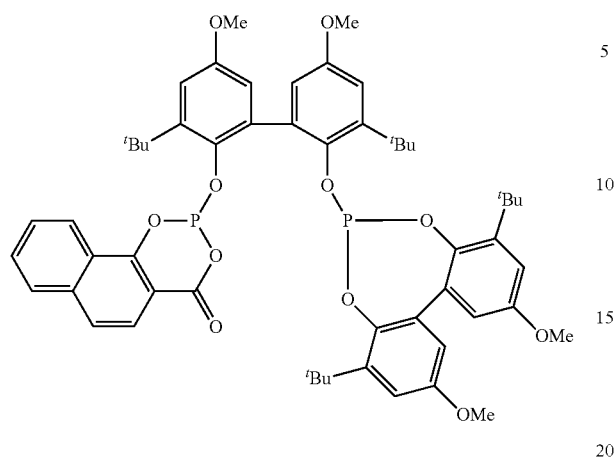
3-b
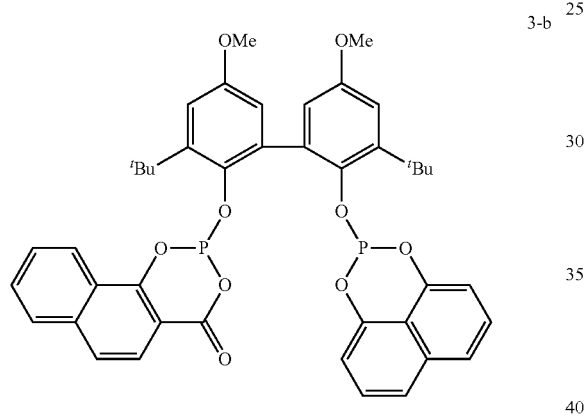
4-a
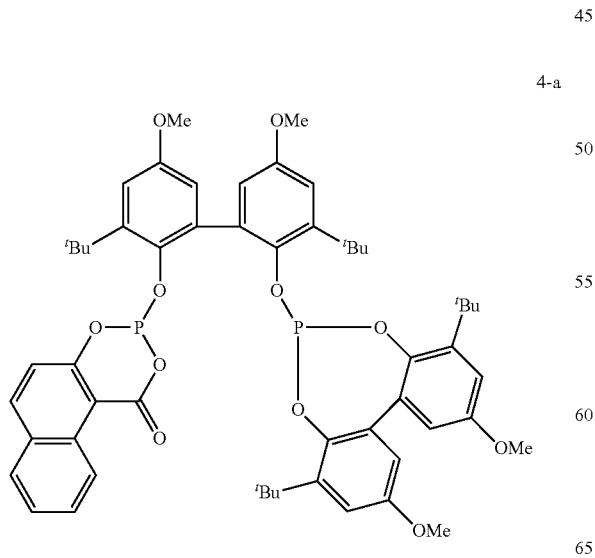
4-b
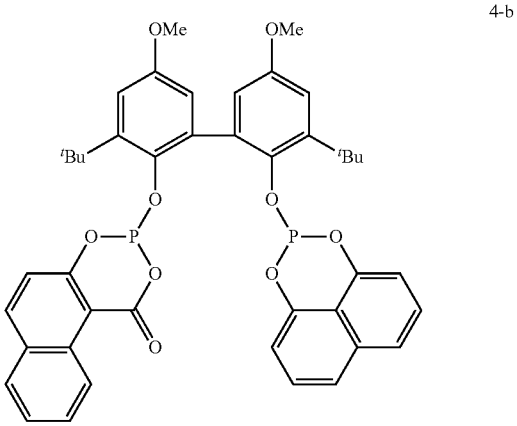
5-a
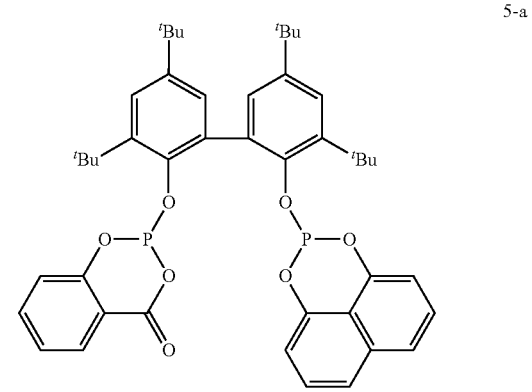
6-a
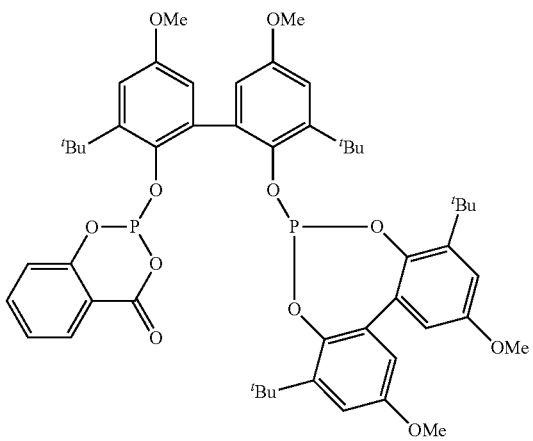

6-b
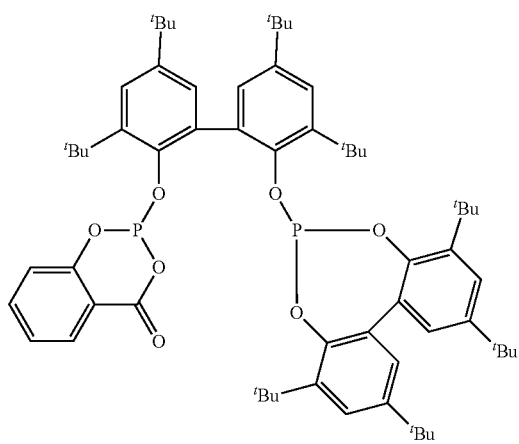
6-c
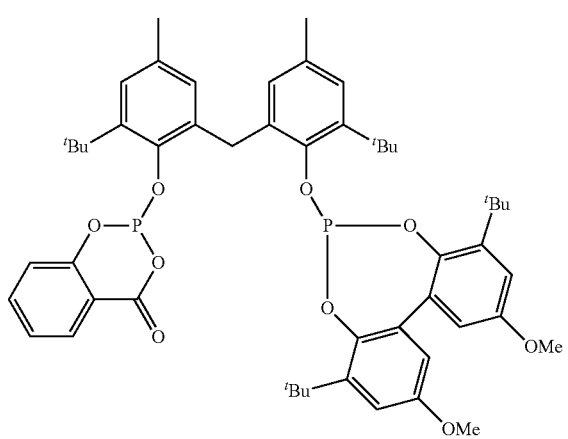
6-d
6-e
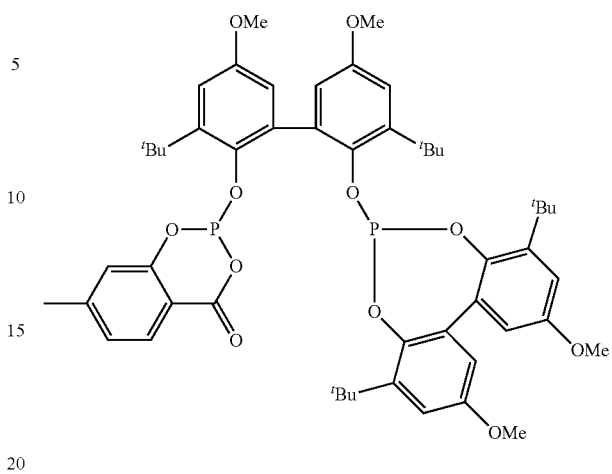
6-f
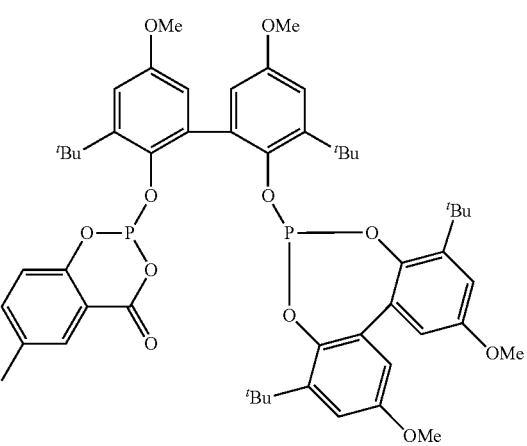
6-g
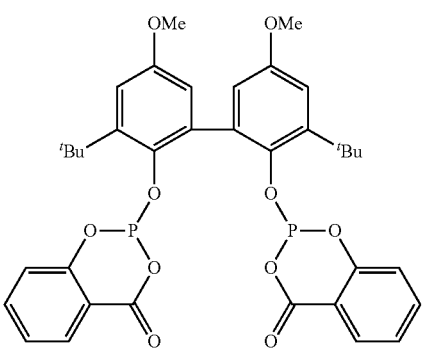
In a further preferred embodiment of the process of the invention, use is made of hydroformylation reaction mixtures which comprise the heteroacyl phosphites of the general formula (1) described in DE 10 2004 013 514,

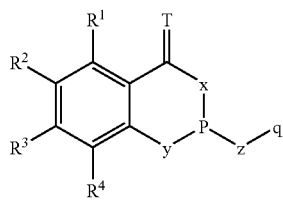

(1)

where $R^1$, $R^2$, $R^3$, $R^4$ and q are identical or different and are each a substituted or unsubstituted aliphatic, alicyclic, aromatic, heteroaromatic, mixed aliphatic-alicyclic, mixed aliphatic-aromatic, heterocyclic, mixed aliphatic-heterocyclic hydrocarbon radical having from 1 to 70 carbon atoms, H, F, Cl, Br, I, —$CF_3$, —$CH_2(CF_2)_jCF_3$ where j=0-9, —$OR^5$, —$COR^5$, —$CO_2R^5$, —$CO_2M$, —$SiR^5_3$, —$SR^5$, —$SO_2R^5$, —$SOR^5$, —$SO_3R^5$, —$SO_3M$, —$SO_2NR^5R^6$, —$NR^5R^6$, —N=$CR^5R^6$, with $R^5$ and $R^6$ being identical or different and each having one of the meanings of $R^1$ and M being an alkali metal ion, formally half an alkaline earth metal ion, an ammonium ion or a phosphonium ion, x, y, z and T are each, independently of one another, O, $NR^7$, S, with $R^7$ having one of the meanings of q.

In preferred embodiments, q, $R^1$, $R^2$, $R^3$ and $R^4$ have the abovementioned meanings for hydrocarbon radicals, but the radicals are unsubstituted and have from 1 to 50, in particular from 1 to 25, carbon atoms.

Furthermore, $R^5$, $R^6$ and $R^7$ are preferably H or an unsubstituted aliphatic or aromatic hydrocarbon radical having from 1 to 25 carbon atoms.

It is possible for two adjacent radicals $R^1$ to $R^4$ ($R^1$ and $R^2$, $R^2$ and $R^3$, $R^3$ and $R^4$) together to form a fused, substituted or unsubstituted aromatic, heteroaromatic, aliphatic, mixed aromatic-aliphatic or mixed heteroaromatic-aliphatic ring system.

In a preferred heteroacyl phosphite of the formula (1), the radical q is selected from among aromatics or heteroaromatics which are unsubstituted or substituted by at least one radical selected from among aliphatic, alicyclic, aromatic, heteroaromatic, mixed aliphatic-alicyclic, mixed aliphatic-aromatic, heterocyclic, mixed aliphatic-heterocyclic hydrocarbon radicals having from 1 to 25 carbon atoms, F, Cl, Br, I, —$CF_3$, —$CH_2(CF_2)_jCF_3$ where j=0-9, —$OR^5$, —$COR^5$, —$CO_2R^5$, —$CO_2M$, —$SiR^5_3$, —$SR^5$, —$SO_2R^5$, —$SOR^5$, —$SO_3R^5$, —$SO_3M$, —$SO_2NR^5R^6$, —$NR^5R^6$ and —N=$CR^5R^6$, with $R^5$, $R^6$ and M being as defined above.

In a further process variant, use is made of a heteroacyl phosphite of the formula (1) whose radical q comprises radicals —W—R, where W is a divalent substituted or unsubstituted aliphatic, alicyclic, mixed aliphatic-alicyclic, heterocyclic, mixed aliphatic-heterocyclic, aromatic, heteroaromatic, mixed aliphatic-aromatic hydrocarbon radical having from 1 to 50 carbon atoms and the radical R is a —$OR^5$, —$NR^5R^6$, phosphite, phosphonite, phosphinite, phosphine or heteroacyl phosphite, with $R^5$ and $R^6$ being identical or different and each having one of the meanings of $R^1$ but each preferably being, independently of one another, H or an unsubstituted aliphatic or aromatic hydrocarbon radical having from 1 to 25 carbon atoms.

In a preferred heteroacyl phosphite of the formula (1) having a radical q with —W—R, W is a radical of the formula (2)

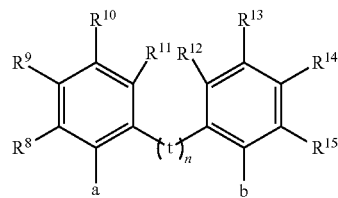

(2)

where $R^8$, $R^9$, $R^{10}$, $R^{11}$, $R^{12}$, $R^{13}$, $R^{14}$ and $R^{15}$ are identical or different and each have one of the meanings of q and are preferably each, independently of one another, a monovalent substituted or unsubstituted aliphatic, alicyclic, aromatic, heteroaromatic, mixed aliphatic-alicyclic, mixed aliphatic-aromatic, heterocyclic, mixed aliphatic-heterocyclic hydrocarbon radical having from 1 to 50 carbon atoms H, F, Cl, Br, I, —$CF_3$, —$CH_2(CF_2)_jCF_3$ where j=0-9, —$OR^5$, —$COR^5$, —$CO_2R^5$, —$CO_2M$, —$SiR^5_3$, —$SR^5$, —$SO_2R^5$, —$SOR^5$, —$SO_3R^5$, —$SO_3M$, —$SO_2NR^5R^6$, —$NR^5R^6$, —N=$CR^5R^6$, with $R^5$ and $R^6$ being selected independently from among H and monovalent substituted or unsubstituted aliphatic and aromatic hydrocarbon radicals having from 1 to 25 carbon atoms and M being an alkali metal ion, formally half an alkaline earth metal ion, an ammonium ion or a phosphonium ion.

t is a $CR^{16}R^{17}$, $SiR^{16}R^{17}$, $NR^{16}$, O or S radical. $R^{16}$ and $R^{17}$ are defined like $R^5$ or $R^6$, n is 0 or 1 and the positions a and b serve as linkage points.

It is possible for two adjacent radicals $R^8$ to $R^{15}$ together to form a fused substituted or unsubstituted aromatic, heteroaromatic, aliphatic, mixed aromatic-aliphatic or mixed heteroaromatic-aliphatic ring system.

In a further heteroacyl phosphite of the formula (1) which can be used in the process, W has the formula (3)

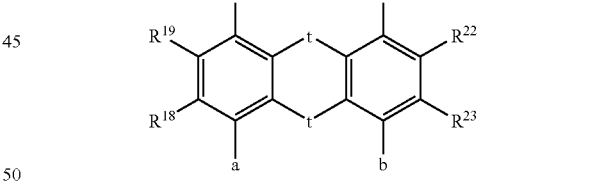

(3)

where $R^{18}$, $R^{19}$, $R^{20}$, $R^{21}$, $R^{22}$ and $R^{23}$ are identical or different and each have one of the meanings of q and are preferably each, independently of one another, a monovalent substituted or unsubstituted aliphatic, alicyclic, aromatic, heteroaromatic, mixed aliphatic-alicyclic, mixed aliphatic-aromatic, heterocyclic, mixed aliphatic-heterocyclic hydrocarbon radical having from 1 to 50 carbon atoms H, F, Cl, Br, I, —$CF_3$, —$CH_2(CF_2)_jCF_3$ where j=0-9, —$OR^5$, —$COR^5$, —$CO_2R^5$, —$CO_2M$, —$SiR^5_3$, —$SR^5$, —$SO_2R^5$, —$SOR^5$, —$SO_3R^5$, —$SO_3M$, —$SO_2NR^5R^6$, —$NR^5R^6$, —N=$CR^5R^6$, with $R^5$ and $R^6$ being selected independently from among H and monovalent substituted or unsubstituted aliphatic and aromatic hydrocarbon radicals having from 1 to 25 carbon atoms and M being an alkali metal ion, formally half an alkaline earth metal ion, an ammonium ion or a phosphonium ion.

The positions a and b in the formulae 2 and 3 serve as linkage points to the radical R and to z in the formula (1). t is a $CR^{16}R^{17}$, $SiR^{16}R^{17}$, $NR^{16}$, O or S radical, with $R^{16}$ and $R^{17}$ being defined like $R^5$ or $R^6$.

It is possible for two adjacent radicals $R^{18}$ to $R^{23}$ together to form a fused substituted or unsubstituted aromatic, heteroaromatic, aliphatic, mixed aromatic-aliphatic or mixed heteroaromatic-aliphatic ring system.

Some heteroacyl phosphite ligands which can particularly preferably be present as organophosphorus ligands in the hydroformylation reaction mixture used in the process of the invention are shown by way of example below, Me being a methyl group, $^t$Bu being a tert-butyl group and Ph a phenyl group.

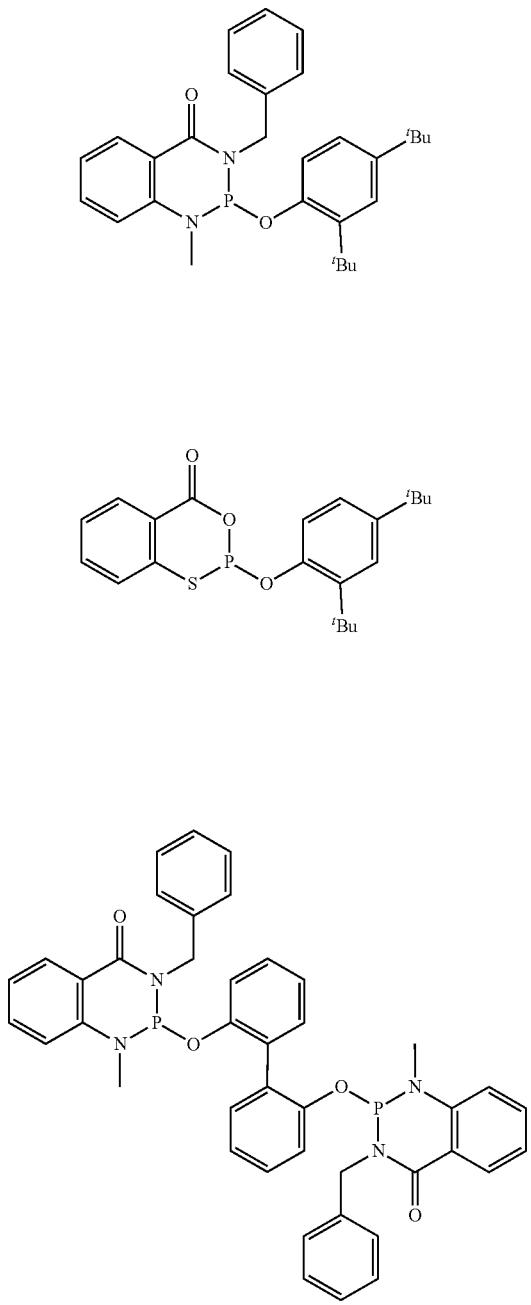

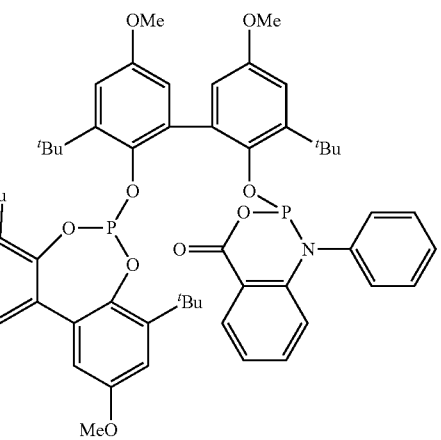

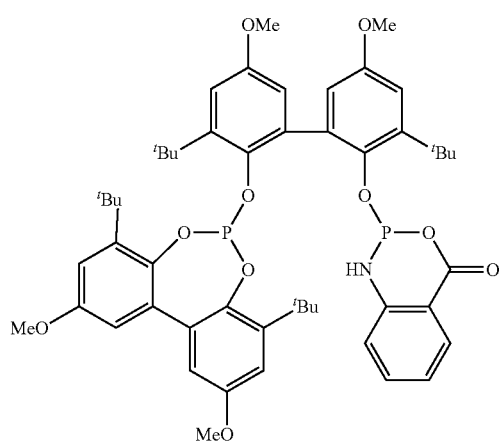

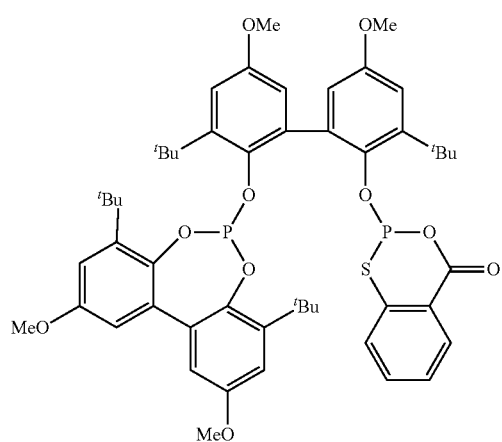

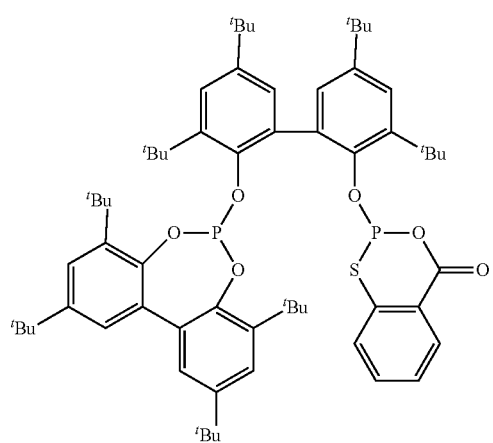
(G)
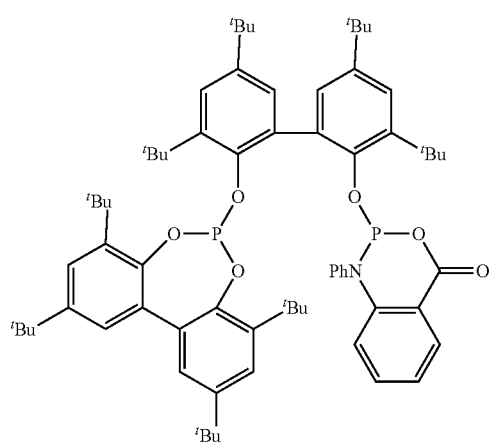
(H)
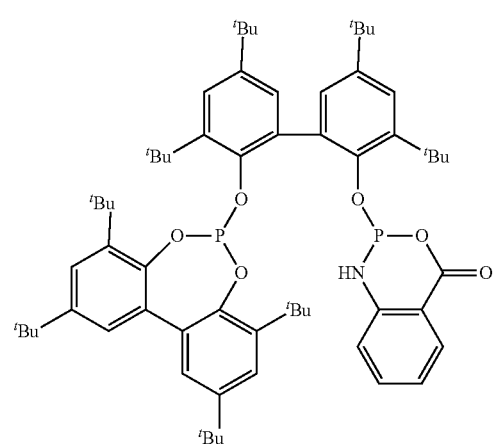
(J)
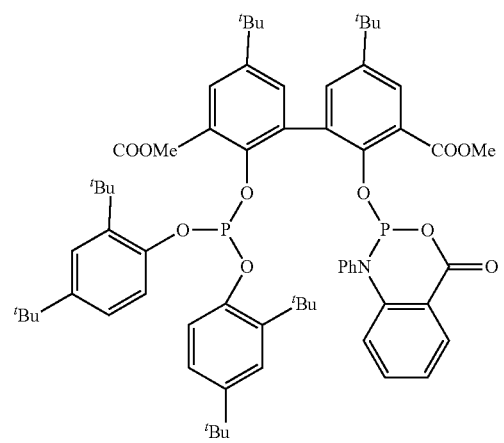
(K)
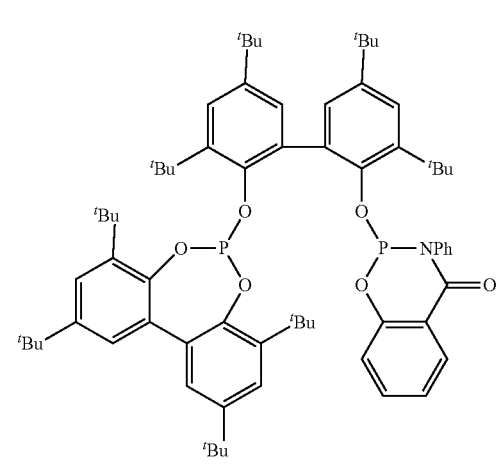
(L)
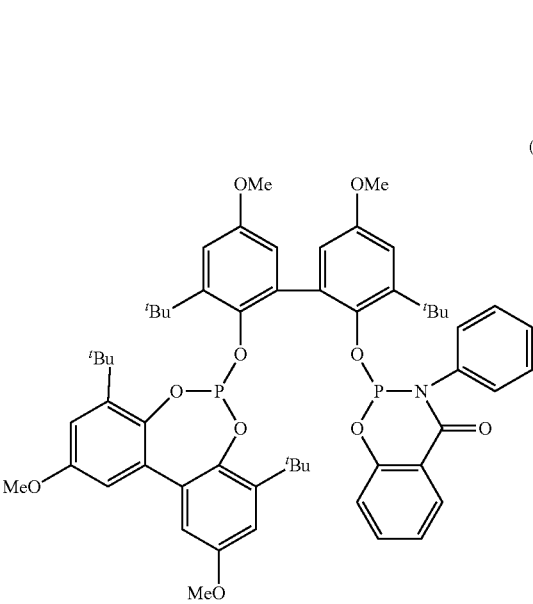
(M)

(N)
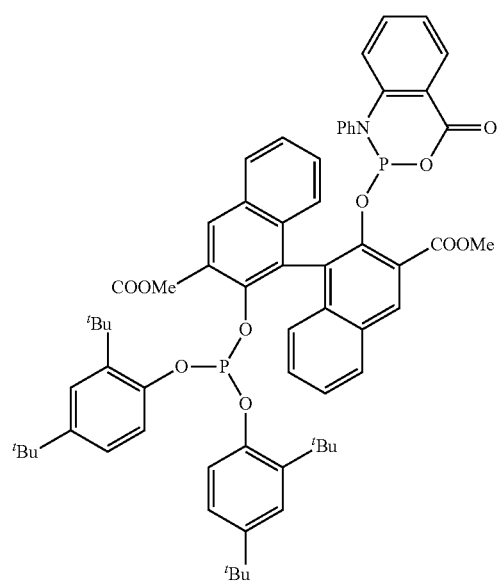
(Q)
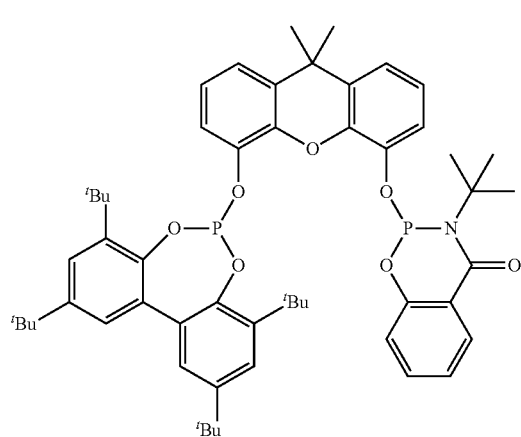
(O)
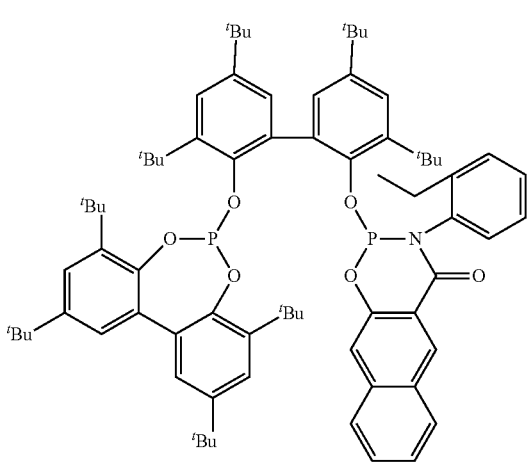
(R)
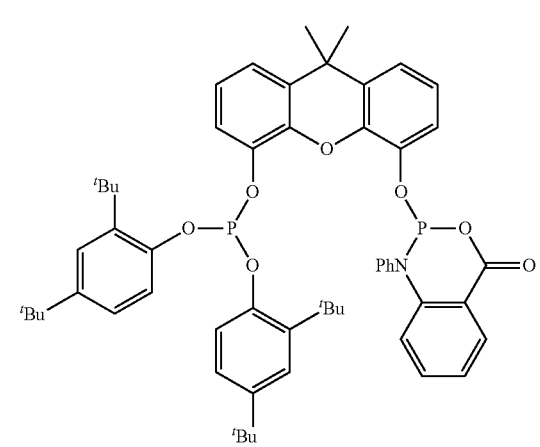
(P)
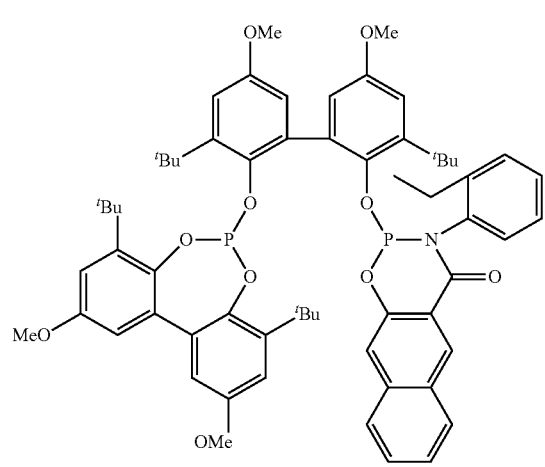
(S)
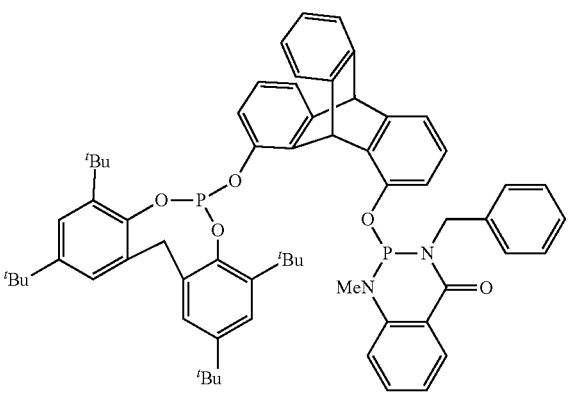

(T)

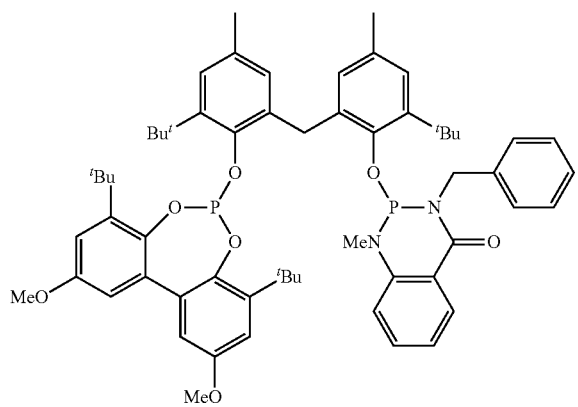

(U)

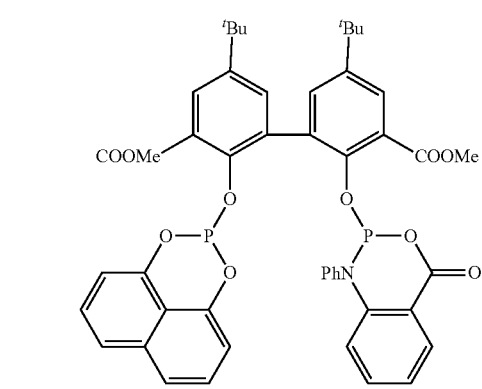

(V)

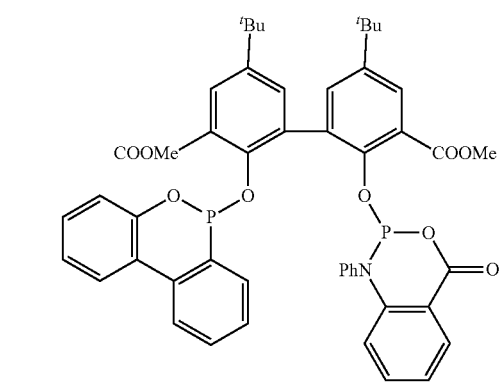

(W)

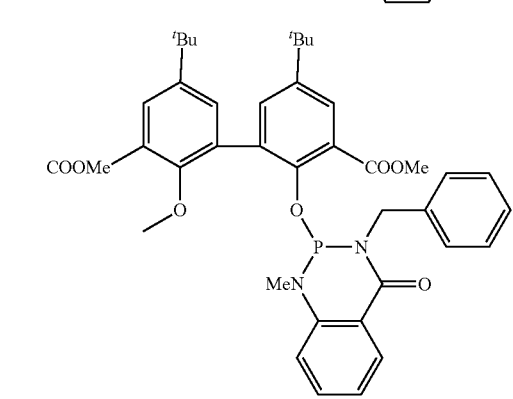

Heteroacyl phosphites of the formula (1) can be prepared by a sequence of reactions of phosphorus halides with alcohols, amines, thiols, carboxylic acids, carboxamides, thiocarboxylic acids, α-hydroxyarylcarboxylic acids, α-hydroxyarylcarboxamides, α-hydroxyarylthiocarboxylic acids, α-aminoarylcarboxylic acids, α-aminoarylcarboxamides, α-aminoarylthiocarboxylic acids, α-mercaptoarylcarboxylic acids, α-mercaptoarylcarboxamides and/or α-mercaptoarylthiocarboxylic acids in which halogen atoms on the phosphorus are replaced by oxygen, nitrogen and/or sulfur groups. The basic procedure is illustrated by way of example by means of a group of compounds of the general formula (1):

In a first step, a compound of the formula (1a) is reacted with a phosphorus trihalide $P(Hal)_3$, e.g. $PCl_3$, $PBr_3$ and $PI_3$, preferably phosphorus trichloride $PCl_3$, without base or in the presence of a base which is used in equivalent or catalytic amounts to form the compound of the formula (1b).

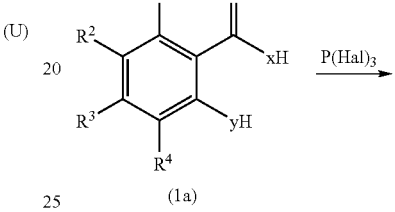

(1a)

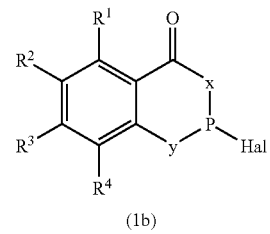

(1b)

In a second reaction step, the compound (1b) is reacted with an alcohol HO-q or with an amine $HN(R^7)$-q or with a thiol HS-q without base or in the presence of a base which is used in equivalent or catalytic amounts to give the desired heteroacyl phosphite of the formula (1).

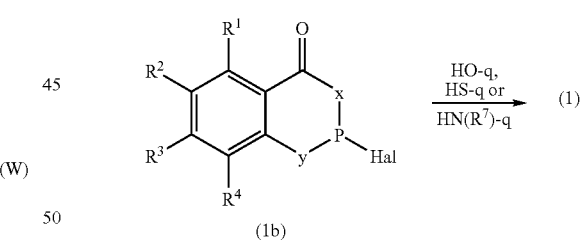

(1b)

The radicals $R^1$ to $R^4$, $R^7$ and x, y and q are as defined above.

Since the alcohols, amines, thiols or carboxylic acid derivatives used and their downstream products are frequently solid, the reactions are generally carried out in solvents. Solvents used are aprotic solvents which react neither with the alcohols, amines, thiols or carboxylic acid derivatives nor with the phosphorus compounds. Suitable solvents are, for example, tetrahydrofuran, ethers such as diethyl ether or MTBE (methyl tert-butyl ether) or aromatic hydrocarbons such as toluene.

The reaction of phosphorus halides with alcohols, amines, thiols or carboxylic acid derivatives forms hydrogen halide which is given off as a result of heating or is bound by means of bases added in equivalent or catalytic amounts. Examples of bases are tertiary amines such as triethylamine, pyridine or N-methylpyrrolidone. It is sometimes also useful to convert the alcohols into metal alkoxides, for example by reaction with sodium hydride or butyllithium, prior to the reaction.

The solvents used have to be very largely free of water and oxygen, and preference is given to using solvents having a water content of from 0 to 500 ppm by mass, particularly preferably from 0 to 250 ppm by mass. The water content can, for example, be determined by the Karl-Fischer method.

The solvent can be dried by distilling it over a suitable desiccant or by passing the solvent through a cartridge or column filled, for example, with 4 Å molecular sieves.

The steps of the synthesis preferably occur at temperatures of from −80° C. to 150° C.; in most cases, it has been found to be appropriate to work at temperatures of from −20° C. to 110° C., particularly preferably from 0° C. to 80° C.

The metal in the complex catalyst present in the hydroformylation reaction mixture used according to the invention can be a metal of group 4, 5, 6, 7, 8, 9 or 10 of the Periodic Table of the Elements. Examples of particularly suitable metals are rhodium, cobalt, iridium, nickel, palladium, platinum, iron, ruthenium, osmium, chromium, molybdenum and tungsten. The metal complex catalyst particularly preferably has rhodium as metal.

The catalyst metals can be introduced into the hydroformylation reaction in the form of salts or complexes; in the case of rhodium, suitable compounds are, for example, rhodium carbonyls, rhodium nitrate, rhodium chloride, $Rh(CO)_2(acac)$ (acac=acetylacetonate), rhodium acetate, rhodium octanoate and rhodium nonanoate.

The active catalyst species is formed from the organophosphorus ligands and the catalyst metal under the reaction conditions of the hydroformylation. In the hydroformylation, a carbonylhydrido-organophosphorus ligand-metal complex is formed on contact with synthesis gas. The organophosphorus ligands and, if desired, further ligands can be added in free form together with the catalyst metal (as salt or complex) to the reaction mixture in order to produce the active catalyst species in situ. Furthermore, it is also possible to use an organophosphorus ligand-metal complex which contains the abovementioned organophosphorus ligands and the catalyst metal as precursor for the actual catalytically active complex. These organophosphorus ligand-metal complexes are prepared by reacting the appropriate catalyst metal of groups 4 to 10 in the form of a chemical compound with the organophosphorus ligand. The organophosphorus ligands are preferably used in excess, so that organophosphorus ligands are present as free ligands in the hydroformylation reaction mixture used in the process of the invention.

The hydroformylation reaction mixture preferably originates from a hydroformylation process in which from 1 to 500 mol, preferably from 1 to 200 mol and particularly preferably from 2 to 50 mol, of organophosphorus ligands are used per mol of metal of groups 4 to 10 of the Periodic Table. Fresh organophosphorus ligands can be added to the hydroformylation reaction at any point in time in order to keep the concentration of free heteroacyl phosphite, i.e. heteroacyl phosphite which is not coordinated to the metal, constant.

The concentration of the metal in the hydroformylation reaction mixture is preferably in the range from 1 ppm to 1000 ppm, more preferably in the range from 5 ppm to 300 ppm, based on the total weight of the hydroformylation reaction mixture.

The molar ratio of hydroformylation product, in particular aldehyde product, to free ligand in the feed stream to the membrane, in particular in the feed stream to the first membrane separation step, is preferably more than 10:1.

The hydroformylation reactions carried out using the organophosphorus ligands or the corresponding metal complexes can be carried out by known methods, as described, for example, in J. FALBE, "New Syntheses with Carbon Monoxide", Springer Verlag, Berlin, Heidelberg, N.Y., page 95 ff., (1980). The olefin compound(s) is(are) reacted in the presence of the catalyst with a mixture of CO and $H_2$ (synthesis gas) to form the aldehydes having one more carbon atom.

The reaction temperatures are preferably from 40° C. to 180° C., more preferably from 75° C. to 140° C. In the hydroformylation, the synthesis gas pressures are from 0.1 to 30 MPa, preferably from 1 to 6.4 MPa. The molar ratio of hydrogen to carbon monoxide ($H_2$/CO) in the synthesis gas is preferably from 10/1 to 1/10 and more preferably from 1/1 to 2/1.

The catalyst or the ligand is preferably homogeneously dissolved in the hydroformylation reaction mixture comprising starting materials (olefins and synthesis gas) and products (aldehydes, alcohols, high boilers formed in the process). In addition, a solvent can additionally be present and can also be selected from among the starting materials (olefins) or products (aldehydes) of the reaction. Further possible solvents are organic compounds which do not interfere in the hydroformylation reaction and are preferably easy to separate off again, e.g. by distillation or extraction. Such solvents can be, for example, hydrocarbons such as toluene.

The starting materials for the hydroformylation can be olefins or mixtures of olefins having from 2 to 25 carbon atoms and a terminal or internal C=C double bond. Preferred starting materials are α-olefins in general, e.g. propene, 1-butene, 2-butene, 1-hexene, 1-octene, and also dimers and trimers of butene (isomer mixtures), in particular dibutene and tributene.

It can be advantageous for compounds having stabilizing properties, in particular compounds having stabilizing properties in respect of the stability of the ligands or of the complex catalyst, to be present in the hydroformylation reaction mixture. Such compounds which can be used as stabilizer can be, for example, sterically hindered amines as described, for example, in WO 2005/039762, in particular sterically hindered secondary amines as described, for example, in DE 10 2005 042 464.

The hydroformylation can be carried out continuously or batchwise. Examples of industrial embodiments are stirred vessels, bubble columns, jet nozzle reactors, tube reactors and loop reactors, some of which can be cascaded and/or provided with internals. The reaction can be carried out in one or more stage(s).

The present invention is illustrated by way of example with the aid of the figures FIG. 1, FIG. 2 and FIG. 3, without the invention being restricted to these embodiments.

BRIEF DESCRIPTION OF DRAWINGS

FIG. 1 schematically shows one embodiment of the process of the invention. In this embodiment, the reactants 1 and a recycle stream 6 are fed into the reactor R in which the hydroformylation takes place. The hydroformylation reaction mixture 2 is fed directly to the membrane M of the membrane separation step. The retentate stream 3 obtained at the membrane is recirculated to the reaction. The permeate stream 4 obtained at the membrane M is fed into a thermal separation apparatus D, e.g. a thin film evaporator. In this, the permeate stream is separated into hydroformylation product and any unreacted olefins which leave the thermal separation apparatus as stream 5 and a stream 6 which contains high boilers and complex catalyst and/or free ligands which has/have not been separated off in the membrane separation and is recirculated to the reactor R.

FIG. 2 shows one embodiment of the process of the invention. This embodiment corresponds essentially to that shown in FIG. 1. In addition, a degassing stage E in which the permeate stream 4 is freed, usually by depressurization, of gaseous constituents 8, e.g. carbon monoxide and hydrogen, which can be passed to a work-up or be recirculated to the reactor is present. The remaining liquid part 7 of the permeate stream is then fed as usual into the thermal separation apparatus.

FIG. 3 shows a further embodiment of the process of the invention. The starting material 1' (olefin or olefin mixture), synthesis gas 2' and catalyst solution 18 are fed into the hydroformylation reactor R. The hydroformylation product mixture 3' is separated in the vessel 4' to give a gas phase 6' and a liquid phase 5'. The liquid phase, in which a certain amount of carbon monoxide is dissolved as a function of the carbon monoxide vapor pressure in the gas phase 6', is conveyed together with stream 14 by means of a pump, which also generates the transmembrane pressure, into the membrane unit M1. The retentate 7' goes into the collection vessel 11 in which a gas phase 12 is separated off if desired. A part 14 of the retentate is recirculated to the membrane unit M1 to adjust the flow velocity and/or the feed concentration of the catalyst. The other part of the retentate (catalyst recycle stream) is, if desired after discharge of a partial amount 15 and supplementation with fresh catalyst 17, fed as stream 18 into the hydroformylation reactor. When the plant is operated using a second membrane unit, stream 18 additionally contains stream 27. The permeate 8' in the collection vessel 9 can, if desired, be separated into a gas phase 10 and a liquid phase 19. The stream 19 can be separated in a depressurization unit En to give a low boiler stream 20, which can be entirely or partly introduced into the reactor R via a line which is not shown, and a liquid phase 21. The liquid phase 21 is fed to a thin film evaporator D. It is separated there into a distillate 22, which contains unreacted starting material and the desired products, and a bottom product 23 containing high boilers and possibly catalyst and its downstream products. The further work-up of the distillate 22 is carried out in a distillation plant which is not shown. In the case of a plant without the depressurization unit En, stream 19 instead of stream 21 is fed to the thin film evaporator D. Stream 23 is separated at the membrane M2 into a permeate stream 24, which is virtually free of rhodium and is discharged, and a rhodium-containing permeate stream which is, if desired after discharge of a partial amount 26, introduced into the catalyst recycle stream 16. In the case of plants without a second membrane stage M2, the high boiler 23 is discharged. Optionally, a partial amount thereof can be recirculated to the reactor R via a line which is not shown. The offgas streams 6, 10 and 12 can, either separately or together after compression, be recirculated in their entirety or partly to the reactor R (lines not shown).

FIG. 4 shows a schematic process flow diagram corresponding to example 1. The process comprises a reaction in reactor R and a nanofiltration N. For the first reaction, the feed mixture 1a, which contains olefin, rhodium compound and ligand, is placed in the reactor R and reacted. The reaction product 2a is transferred to the nanofiltration N. In the nanofiltration, the permeate 3a which consists predominantly of reaction product is obtained at the membrane. The retentate 4a obtained in the nanofiltration, which contains the catalyst and the ligand, is mixed with fresh olefin T. This mixture 5a is fed back into the reactor R.

Figure 5:
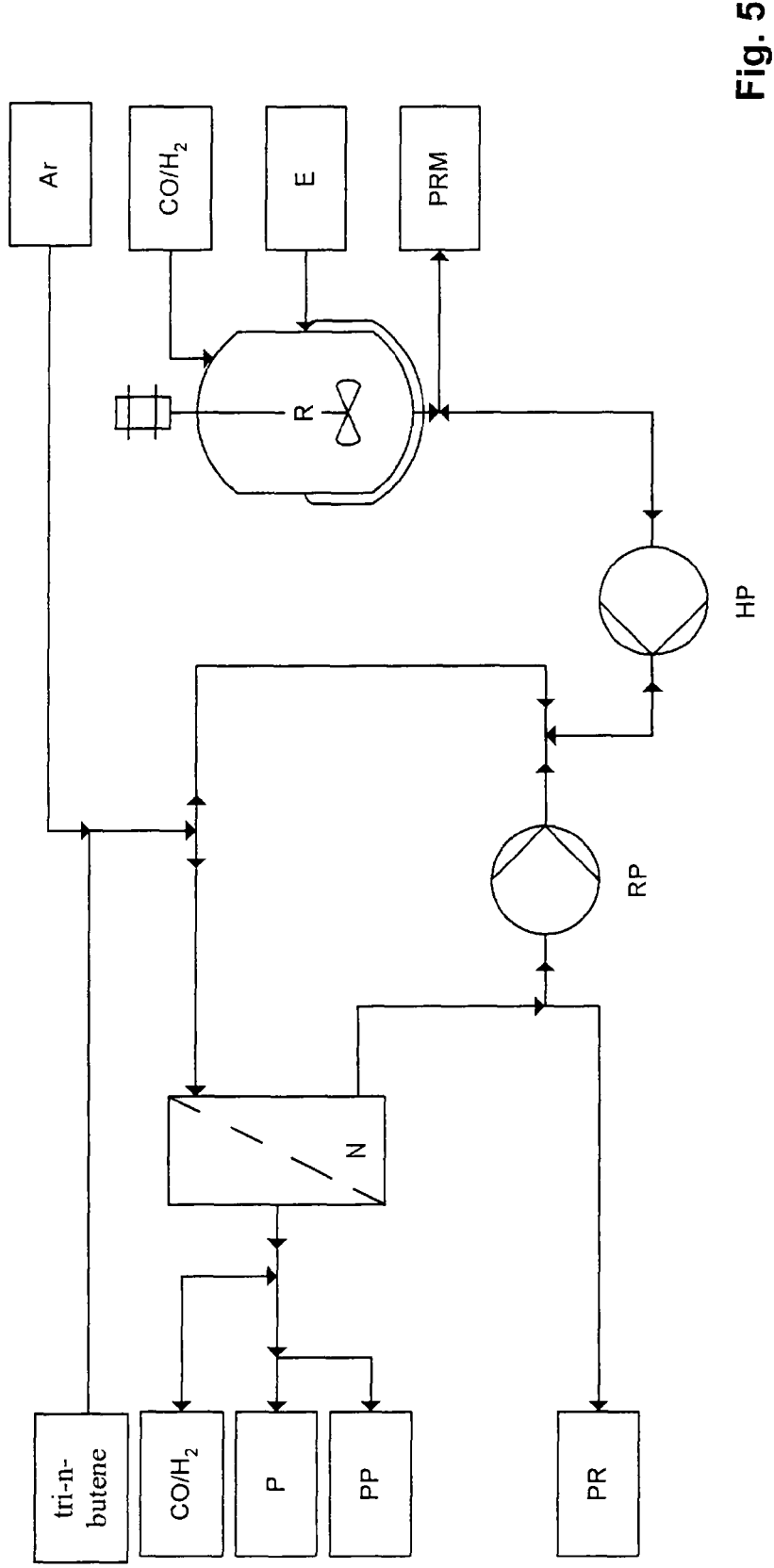
FIG. 5 shows an aspect of the invention that includes the addition of CO to the permeate from the membrane.

The experimental plant used in examples 1 and 2 is depicted in FIG. 5. The experimental plant comprises a reactor R and a nanofiltration N. The starting material E and synthesis gas $CO/H_2$ can be fed to the reactor R which is equipped with a stirrer. At the outlet of the reactor, a sample PRM can be taken for analysis of the reaction mixture obtained. The reaction mixture is fed by means of a high-pressure pump HP to a circuit which leads to the nanofiltration N. The recirculation pump RP ensures the necessary flow over the membrane. On the permeate side, the permeate P is taken off from the nanofiltration. A sampling facility for taking a sample of the permeate PP is present in the discharge line for the permeate P. In addition, the discharge line is provided with a connection via which synthesis gas ($CO/H_2$) can be fed in or discharged on the permeate side, enabling the pressure on the permeate side to be adjusted. In the discharge line for the retentate from the nanofiltration there is a sampling device by means of which a sample of the retentate PR can be taken for analytical purposes. Before the inlet into the nanofiltration, an inlet via which tri-n-butene can be added with the aid of argon gas pressure Ar and can be recirculated mixed with retentate to the reactor R is provided in the circuit.

The following examples illustrate the invention without restricting its scope which is defined by the claims and the description.

EXAMPLE 1

According to the Invention

Figure 1:
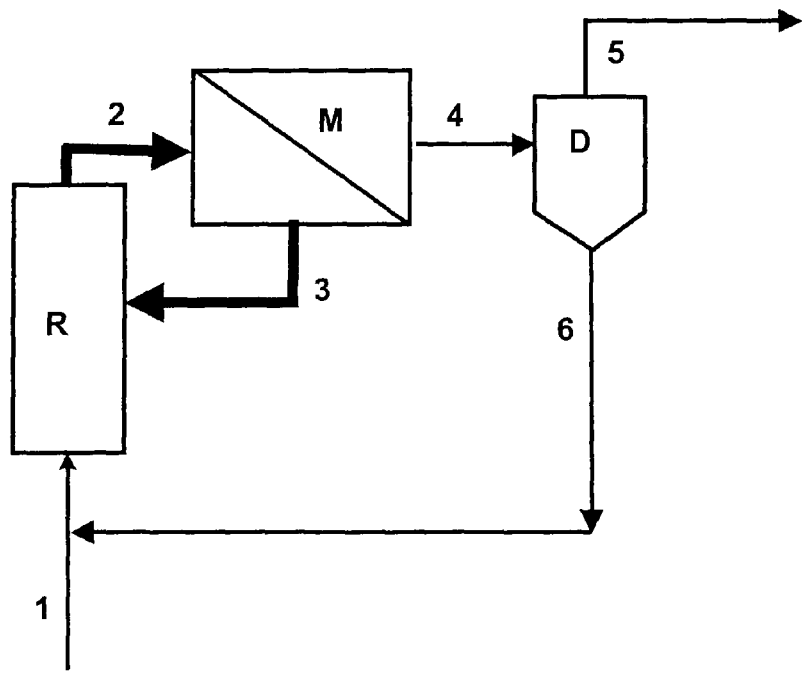
FIG. 1 shows an embodiment of the process of the invention with reactant recycle.
Figure 2:
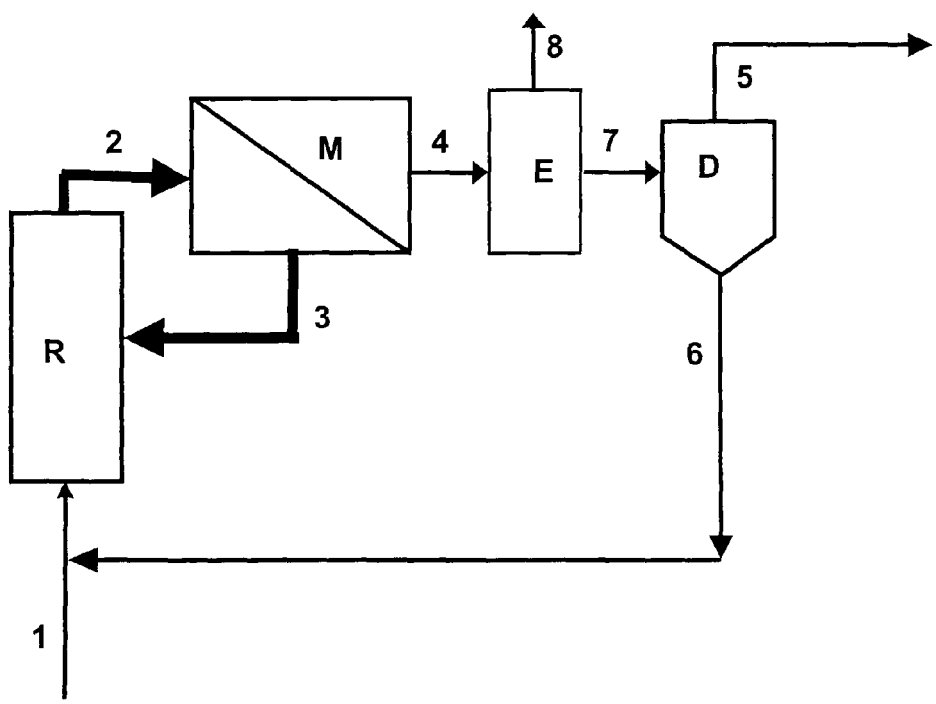
FIG. 2 shows another embodiment of the invention including a degasing stage.
Figure 3:
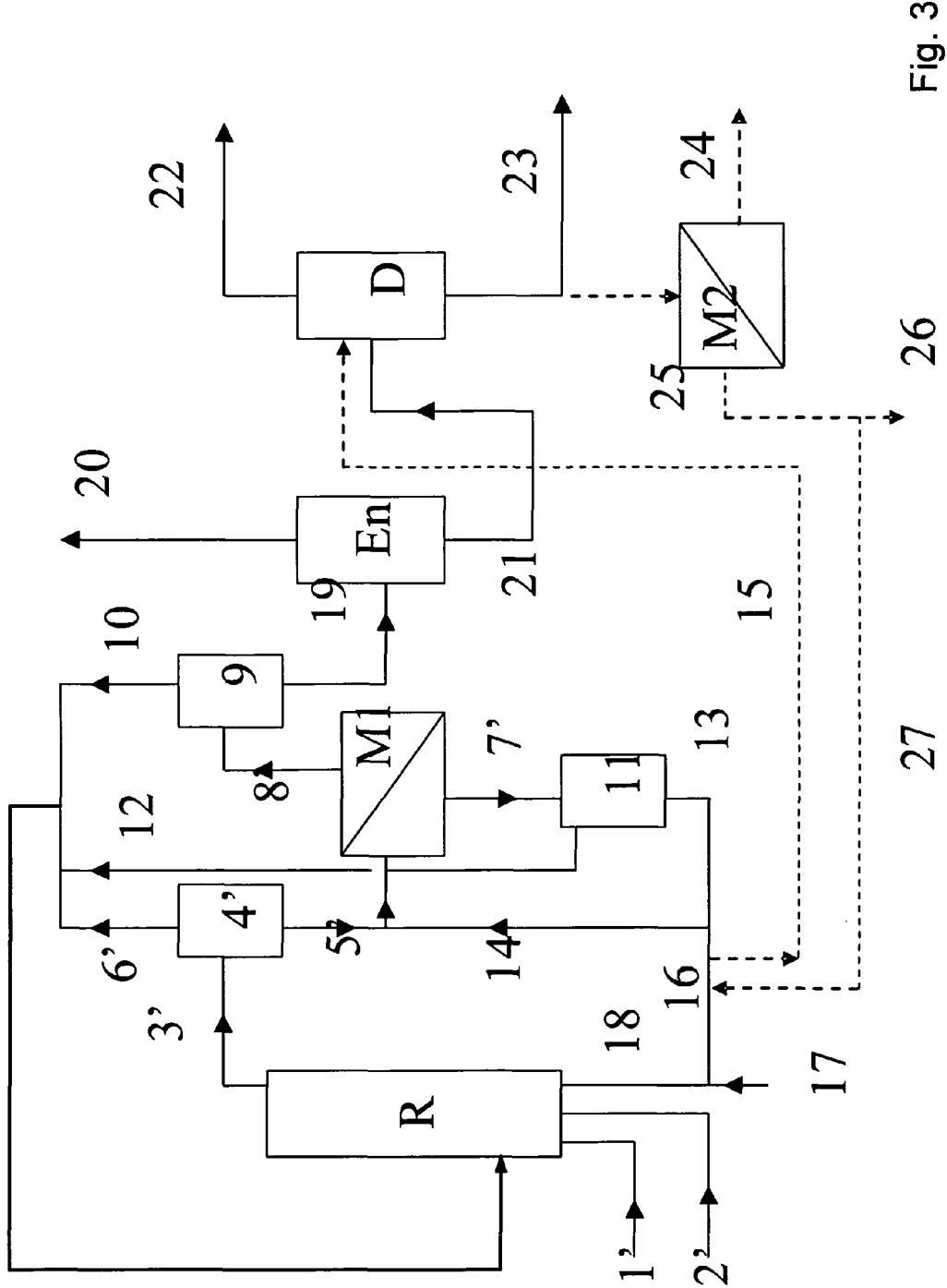
FIG. 3 shows the process of the invention with retentate recirculation.
Figure 4:
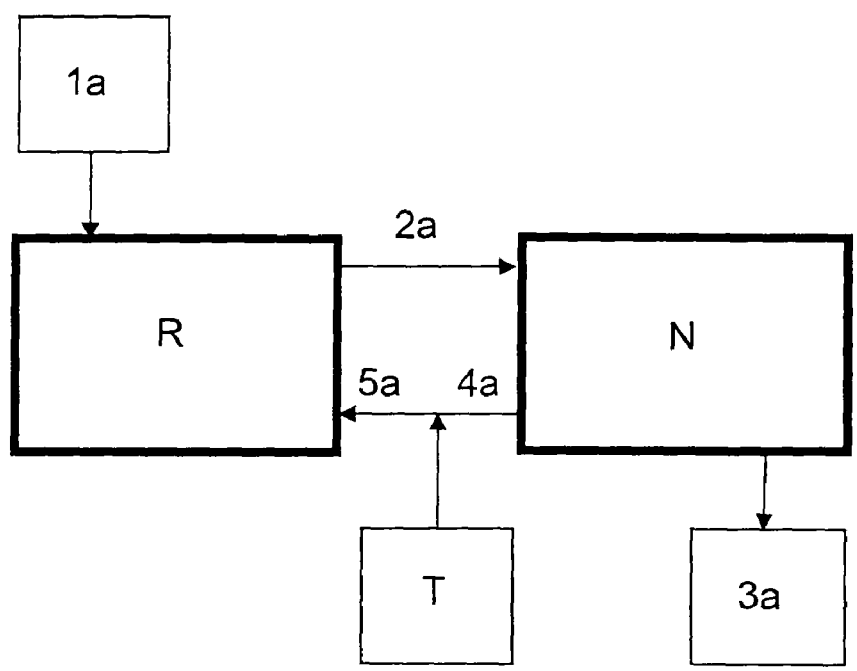
FIG. 4 shows another aspect of the invention.

Hydroformylation reactions of tri-n-butene with synthesis gas to form isotridecanal were carried out in an experimental plant as depicted in FIG. 5. The catalyst-ligand system was subsequently separated off by means of nanofiltration for reuse in the next hydroformylation reaction. The two process steps were carried out batchwise in succession. FIG. 4 shows a schematic process flow diagram. A total of four hydroformylations and three nanofiltration steps were carried out alternately in a process sequence.

For the first reaction, the starting material (1a) having the following composition:
- 996 g of tri-n-butene (OXENO Olefinchemie GmbH)
- 8.72 mg of Rh (as rhodium nonanate (rhodium alkoxide of nonanol)
- 297 mg of Alkanox 240 (tris(2,4-di-tert-butylphenyl) phosphite) as ligand (Great Lakes Chemical Corp.)

was placed in the reactor with exclusion of oxygen.

After reaction for 4 hours at 150° C. under a synthesis gas ($CO/H_2$, mass ratio=1:1) pressure of 260 bar, the reaction product mixture was cooled to 60° C., and degassed to 17 bar and transferred together with the dissolved catalyst system to the nanofiltration plant (N). This was a unit which is fed by means of a high-pressure pump and builds up the required transmembrane pressure in the system. From there, the medium to be filtered goes via a recirculation pump into the membrane module "Memcell" from Osmota having an area of 80 cm². This module was provided with a Starmem 240 membrane from Grace Davison over which the medium to be filtered flowed at 1.3 m/s under a transmembrane pressure of 25 bar. To stabilize the catalyst-ligand complex, a synthesis gas ($CO/H_2$, mass ratio=1:1) pressure of 17 bar was maintained on the permeate side, so that, at a transmembrane pressure of 25 bar, a pressure of 42 bar was established on the retentate side.

During the nanofiltration, permeate (3a), which consisted predominantly of reaction product, was taken from the system by the membrane. The catalyst and the Alkanox ligand were very largely retained by the membrane in this feed-batch process and accumulated in the retentate space. After all of the reaction product had been transferred to the nanofiltration plant and had been concentrated by a volumetric concentration factor of about 5, the concentrate obtained (4a), which contained the catalyst-ligand complex remaining in the system, was mixed with fresh starting material (T) (tributene) and this mixture (5) was returned to the reaction vessel. After reaction for another 4 hours at 150° C. under a synthesis gas ($CO/H_2$, mass ratio=1:1) pressure of 260 bar, the reaction product mixture (2) was cooled to 60° C., degassed to a synthesis gas pressure of 17 bar and together with the dissolved catalyst system transferred to the nanofiltration plant (N). A total of four batch reactions and three nanofiltration cycles were carried out in this way. FIG. 5 shows the experimental set-up.

The process chain was evaluated by means of measurement and analytical data obtained by gas-chromatographic analysis, HPLC analysis, atomic absorption spectroscopy and optical emission spectrometry with inductively coupled high-frequency plasma. The reactions were examined in respect of the conversion of tri-n-butene and the yield of and selectivity to isotridecanal. The nanofiltration was examined in respect of permeate flux and retention of rhodium and ligand. Table 1 shows the results of the experiments in example 1.

TABLE 1

Results of example 1

| Process step | Stream | Mass used, Proportion by mass of main components w [-], Rh [mg] ligand [mg] | Total sample mass [g] Conversion (C) Selectivity (S) Retention (R) |
|---|---|---|---|
| HF I, start | Starting material (without synthesis gas) | Mass used: 996.0 g<br>1.00 tri-n-butene<br>0.00 isotridecanal<br>0.00 isotridecanol<br>0.00 other substances<br>8.72 mg of Rh<br>297 mg of ligand | Sample mass: 49.8 g, of which Rh: 0.4 mg |
| HF I, end (= start of NF I) | Liquid HF output I (to NF I) | Total mass: 1095.0 g<br>0.12 tri-n-butene<br>0.78 isotridecanal<br>0.09 isotridecanol<br>0.00 other substances<br>8.32 mg of Rh*<br>285 mg of ligand | Sample mass: 17.3 g, of which Rh: 0.14 mg<br>C, TnB: 0.85<br>S, ITDA: 0.90 |
| NF I | Permeate output I | Permeate mass: 939.5 g<br>0.16 tri-n-butene<br>0.74 isotridecanal<br>0.09 isotridecanol<br>0.00 other substances<br>0.53 mg of Rh<br>3.0 mg of ligand | |
| NF I | Retentate I | Retentate mass: 155.5 g<br>7.65 mg of Rh*<br>282 mg of ligand | R, Rh: 0.94<br>R, ligand: 0.96 |
| HF II | Starting material II | Total mass: 925.5 g<br>0.84 tri-n-butene<br>0.13 isotridecanal<br>0.02 isotridecanol<br>0.00 other substances<br>7.65 mg of Rh*<br>282 mg of ligand | Sample mass: 46.8 g, of which Rh: 0.39 mg |
| HF II | Liquid HF output II (to NF II) | Total mass: 992.7 g<br>0.10 tri-n-butene<br>0.77 isotridecanal<br>0.05 isotridecanol<br>0.00 other substances<br>7.26 mg of Rh*<br>271 mg of ligand | Sample mass: 16.6 g, of which Rh: 0.12 mg<br>C, TnB: 0.85<br>S, ITDA: 0.96 |
| NF II | Permeate output II | Permeate mass: 819.3 g<br>0.21 tri-n-butene<br>0.73 isotridecanal<br>0.05 isotridecanol<br>0.01 other substances<br>0.66 mg of Rh<br>3.27 mg of ligand | |
| NF II | Retentate II | Retentate mass: 156.8 g<br>6.49 mg of Rh*<br>268 mg of ligand | R, Rh: 0.91<br>R, ligand: 0.98 |

TABLE 1-continued

Results of example 1

| Process step | Stream | Mass used, Proportion by mass of main components w [-], Rh [mg] ligand [mg] | Total sample mass [g] Conversion (C) Selectivity (S) Retention (R) |
|---|---|---|---|
| HF III | Starting material III | Total mass: 934.7 g<br>0.90 tri-n-butene<br>0.09 isotridecanal<br>0.01 isotridecanol<br>0.00 other substances<br>6.49 mg of Rh*<br>268 mg of ligand | Sample mass: 51.2 g, of which Rh: 0.31 mg |
| HF III | Liquid HF output III (to NF III) | Total mass: 979.4 g<br>0.27 tri-n-butene<br>0.70 isotridecanal<br>0.02 isotridecanol<br>0.00 other substances<br>6.18 mg of Rh*<br>258 mg of ligand | Sample mass: 17.3 g, of which Rh: 0.11 mg<br>C, TnB: 0.67<br>S, ITDA: 0.97 |
| NF III | Permeate output III | Permeate mass: 751.3 g<br>0.27 tri-n-butene<br>0.69 isotridecanal<br>0.03 isotridecanol<br>0.01 other substances<br>0.50 mg of Rh<br>1.5 mg of ligand | |
| NF III | Retentate III | Retentate mass: 210.8 g<br>5.57 mg of Rh*<br>256 mg of ligand | R, Rh: 0.91<br>R, Ligand: 0.99 |
| HF IV | Starting material IV | Total mass: 932.3 g<br>0.87 tri-n-butene<br>0.12 isotridecanal<br>0.01 isotridecanol<br>0.00 other substances<br>5.57 mg of Rh*<br>256 mg of ligand | Sample mass: 49.7 g, of which Rh: 0.30 mg |
| HF IV | Liquid HF output IV (end product) | Total mass: 969.3 g<br>0.30 tri-n-butene<br>0.68 isotridecanal<br>0.02 isotridecanol<br>0.00 other substances<br>5.14 mg of Rh<br>(5.27 mg of Rh*, calculated)<br>247 mg of ligand | C, TnB: 0.62<br>S, ITDA: 0.98 |

Notes:
The values denoted by * are calculated from the mass balance.
TnB is tri-n-butene,
ITDA is isotridecanal,
HF is hydroformylation and
NF is nanofiltration.

The nanofiltration displays, at specific permeate fluxes in the range from 4 to 6 [kg/m²h], a membrane retention in respect of rhodium of from 70 to 80% at the beginning of concentration and from 95 to 98% at the end of concentration. The reactions using the recirculated catalyst after the respective filtration processes displayed an activity corresponding to the rhodium concentration.

The mass balance over the total process chain showed that 19.2% of the originally used rhodium mass of 8.72 mg were withdrawn from the system via the permeate. In addition, a total of 20.3% of rhodium was lost via sampling. At the end of the process chain, 60.5% of the rhodium originally used, corresponding to 5.27 mg, has to be present in the reactor according to the mass balance. In actual fact, 5.14 mg were found. Accordingly, about 1.5% of the rhodium used had been lost as active catalyst due to clustering of the system.

The example shows that under the conditions selected the catalyst can be retained in active form by means of a nanofiltration.

EXAMPLE 2 (COMPARATIVE EXAMPLE)

A further experiment was carried out by a method analogous to example 1. For the first reaction in this example, the following starting material was initially charged:
1023.6 g of tri-n-butene
8.75 mg of Rh (rhodium nonanate)
291 mg of Alkanox 240 (tris(2,4-di-tert-butylphenyl) phosphite)

After renewed reaction for 4 hours at 150° C. under a synthesis gas ($CO/H_2$, mass ratio=1:1) pressure of 260 bar, the reaction product mixture was cooled to 60° C., degassed to remove CO and transferred together with the dissolved catalyst system to the nanofiltration plant. To stabilize the catalyst-ligand complex, a synthesis gas ($CO/H_2$, mass ratio=1:1) pressure of 17 bar was maintained on the permeate side, so that, at a transmembrane pressure of 25 bar, a pressure of 25 bar was established on the retentate side. The permeate could run off without applied pressure.

After all of the reaction product had been transferred to the nanofiltration plant and been concentrated by a volumetric concentration factor of 5, the concentrate obtained was returned together with fresh starting material (tri-n-butene, T) to the reaction vessel. After renewed reaction for 4 hours at 150° C. under a synthesis gas ($CO/H_2$, mass ratio=1:1) pressure of 260 bar, the reaction product mixture was cooled to 60° C., completely degassed and once again transferred together with the catalyst system dissolved therein to the nanofiltration plant. A total of 4 renewed batch reactions and 3 nanofiltration cycles were carried out in this way.

The process chain was evaluated by means of measurement and analytical data obtained by gas-chromatographic analysis, HPLC analysis, atomic absorption spectroscopy and optical emission spectrometry with inductively coupled high-frequency plasma. The reactions were examined in respect of the conversion of tri-n-butene and the yield of and selectivity to isotridecanal. The nanofiltration was examined in respect of permeate flux and retention of rhodium and ligand. Table 2 shows the results of the experiments.

TABLE 2

Results of example 2

| Process step | Stream | Mass used, Proportion by mass of main components w [-] Rh [mg] ligand [mg] | Total sample mass [g] Conversion (C) Selectivity (S) Retention (R) |
|---|---|---|---|
| HF I, start | Starting material (without synthesis gas) | Mass used: 1023.6 g<br>1.00 tri-n-butene<br>0.00 isotridecanal<br>0.00 isotridecanol<br>0.00 other substances<br>8.75 mg of Rh<br>291 mg of ligand | Sample mass: 65.6 g, of which Rh: 0.40 mg |
| HF I, end (= start of NF I) | Liquid HF output I (to NF I) | Total mass: 1124.8 g<br>0.14 tri-n-butene<br>0.79 isotridecanal<br>0.06 isotridecanol<br>0.00 other substances<br>8.35 mg of Rh*<br>279 mg of ligand | Sample mass: 19.2 g, of which Rh: 0.14 mg<br>C, TnB: 0.83<br>S, ITDA: 0.93 |
| NF I | Permeate output I | Permeate mass: 953.6 g<br>0.16 tri-n-butene<br>0.74 isotridecanal<br>0.09 isotridecanol<br>0.00 other substances<br>0.16 mg of Rh<br>3.0 mg of ligand | |
| NF I | Retentate I | Retenrate mass: 152.0 g<br>8.05 mg of Rh*<br>276 mg of ligand | R, Rh: 0.98<br>R, ligand: 0.99 |
| HF II | Starting material II | Total mass: 1035.8 g<br>0.86 tri-n-butene<br>0.13 isotridecanal<br>0.01 isotridecanol<br>0.00 other substances<br>8.05 mg of Rh*<br>276 mg of ligand | Sample mass: 63.0 g, of which Rh: 0.44 mg |
| HF II | Liquid HF output II (to NF II) | Total mass: 1110.2 g<br>0.18 tri-n-butene<br>0.77 isotridecanal<br>0.05 isotridecanol<br>0.00 other substances<br>7.61 mg of Rh*<br>260 mg of ligand | Sample mass: 18.0 g, of which Rh: 0.10 mg<br>C, TnB: 0.76<br>S, ITDA: 0.94 |
| NF II | Permeate output II | Permeate mass: 875.6 g<br>0.20 tri-n-butene<br>0.74 isotridecanal<br>0.05 isotridecanol<br>0.01 other substances<br>0.19 mg of Rh<br>5.10 mg of ligand | |
| NF II | Retentate II | Retentate mass: 216.6 g<br>7.32 mg of Rh*<br>254.9 mg of ligand | R, Rh: 0.99<br>R, ligand: 0.98 |
| HF III | Starting material III | Total mass: 1045.2 g<br>0.87 tri-n-butene<br>0.11 isotridecanal<br>0.01 isotridecanol<br>0.00 other substances<br>7.32 mg of Rh*<br>254.9 mg of ligand | Sample mass: 60.5 g, of which Rh: 0.42 mg |

TABLE 2-continued

Results of example 2

| Process step | Stream | Mass used, Proportion by mass of main components w [-] Rh [mg] ligand [mg] | Total sample mass [g] Conversion (C) Selectivity (S) Retention (R) |
|---|---|---|---|
| HF III | Liquid HF output III (to NF III) | Total mass: 1106.1 g<br>0.22 tri-n-butene<br>0.74 isotridecanal<br>0.04 isotridecanol<br>0.00 other substances<br>6.9 mg of Rh*<br>244 mg of ligand | Sample mass: 19.6 g,<br>of which Rh: 0.09 mg<br>C, TnB: 0.72<br>S, ITDA: 0.96 |
| NF III | Permeate output III | Permeate mass: 853.4 g<br>0.23 tri-n-butene<br>0.73 isotridecanal<br>0.04 isotridecanol<br>0.01 other substances<br>0.32 mg of Rh<br>4.5 mg of ligand | |
| NF III | Retentate III | Retentate mass: 233.1 g<br>6.53 mg of Rh*<br>239.5 mg of ligand | R, Rh: 0.95<br>R, Ligand: 0.98 |
| HF IV | Starting material IV | Total mass: 1049.9 g<br>0.88 tri-n-butene<br>0.11 isotridecanal<br>0.01 isotridecanol<br>0.00 other substances<br>6.53 mg of Rh*<br>239.5 mg of ligand | Sample mass: 64.3 g,<br>of which Rh: 0.28 mg |
| HF IV | Liquid HF output IV (end product) | Total mass: 1104.1 g<br>0.32 tri-n-butene<br>0.66 isotridecanal<br>0.02 isotridecanol<br>0.00 other substances<br>4.29 mg of Rh<br>(6.25 mg of Rh*, calculated)<br>247 mg of ligand | C, TnB: 0.60<br>S, ITDA: 0.97 |

Notes:
The values denoted by * are calculated from the mass balance.
TnB is tri-n-butene,
ITDA is isotridecanal,
HF is hydroformylation and
NF is nanofiltration.

The nanofiltration displayed, at specific permeate fluxes in the range from 4 to 6 [kg/m$^2$h], a membrane retention both in respect of the ligand Alkanox and in respect of rhodium of from 80 to 95% at the beginning of concentration and >99% at the end of concentration. The mass balance over the total process chain showed that 7.1% of the originally used rhodium mass of 8.3 mg were withdrawn from the system via the permeate. In addition, a total of 21.5% of rhodium was lost via sampling.

At the end of the process chain, 71.4% of the rhodium originally used, corresponding to 6.25 mg, has to be present in the reactor according to the mass balance. In actual fact, 4.29 mg were found. Accordingly, about 22.4% of the rhodium used had been lost as active catalyst due to clustering. The reaction IV accordingly no longer displayed an activity corresponding to the amount of rhodium which is theoretically still present in the system. However, the reduced activity can be explained by the Rh concentration actually measured at the end of the experiments.

Comparison of examples 1 and 2 demonstrates that complete degassing prior to the membrane stage leads to clustering of the Rh-ligand complex being caused by the lack of the ligand CO. This, firstly, makes the rhodium catalyst easier to separate off. However, this advantage is ineffective since active catalyst is in actual fact withdrawn from the system as irreversibly clustered Rh.

The invention claimed is:

1. A process for separating a dissolved complex catalyst of a metal of group 4, 5, 6, 7, 8, 9 or 10 of the Periodic Table of the Elements which has an organophosphorus ligand from a nonaqueous hydroformylation reaction mixture which contains a hydroformylation product and an organic solvent, the process comprising
    performing at least one membrane separation step with at least one membrane which is more permeable to the hydroformylation product than to the organophosphorus ligand, wherein the hydroformylation reaction mixture is supplied to the membrane in the at least one membrane separation step, and wherein the membrane separation step comprises controlling a carbon monoxide partial vapor pressure of at least 200 kPa in the flow to the membrane, in the flow from the membrane and in the permeate.

2. The process as claimed in claim 1, wherein two or more membrane separation steps are used.

3. The process as claimed in claim 1, wherein two or more membranes are used in a membrane separation step.

4. The process as claimed in claim 1, wherein the hydroformylation reaction mixture is supplied to the membrane at a pressure which corresponds to from 90 to 100% of the pressure in the hydroformylation reactor.

5. The process as claimed in claim 1, wherein the hydroformylation reaction mixture is supplied to the membrane at a pressure which corresponds to from 60 to 90% of the pressure in the hydroformylation reactor.

6. The process as claimed in claim 1, wherein the hydroformylation reaction mixture is supplied to the membrane at a pressure which corresponds to from 40 to 60% of the pressure in the hydroformylation reactor, with the proviso that the carbon monoxide partial vapor pressure is at least 200 kPa.

7. The process as claimed in claim 1, wherein the hydroformylation reaction mixture is supplied to the membrane at a pressure which is less than 40% of the pressure in the hydroformylation reactor, with the proviso that the carbon monoxide partial vapor pressure is at least 200 kPa.

8. The process as claimed in claim 1, wherein the separation in the membrane separation step is carried out at a temperature of from 30 to 150° C.

9. The process as claimed in claim 1, wherein the separation in the membrane separation step is carried out at a transmembrane pressure of at least 1 MPa.

10. The process as claimed in claim 9, wherein the separation is carried out at a transmembrane pressure of from 1 to 10 MPa.

11. The process as claimed in claim 1, wherein the membrane is selected a membrane which comprises a separation-active layer, wherein the separation-active layer is:
(A) a polymer layer composed of polydimethylsiloxane (PDMS), polyimide (PI), polyamidimide (PAI), acrylonitrile/glycidyl methacrylate (PANGMA), polyamide (PA) or polyether ether ketone (PEEK),
(B) made up of polymers having intrinsic microporosity (PIM); or
(C) built up over a hydrophobicized ceramic membrane.

12. The process as claimed in claim 1, wherein a membrane which in the solvent system is permeable to molecules having a molar mass of up to 1000 g/mol is used.

13. The process as claimed in claim 1, wherein the membranes are in the form of membrane modules having open-channeled cushion module systems in which the membranes are thermally welded to form membrane pockets or open-channeled, wide-spacer, rolled modules in which the membranes are adhesively bonded to form membrane pockets and are rolled up together with feed spacers around a permeate collection tube.

14. The process as claimed in claim 1, wherein the membrane separation step is carried out using a flow velocity over the membrane of from 0.1 to 15 m/sec.

15. The process as claimed in claim 1, wherein the volume flow ratio of the stream fed to the first membrane of the first membrane separation step, inflow from the reactor including recirculated retentate, to permeate stream is 10-10 000:1.

16. The process as claimed in claim 1, wherein the molecular volume ratio of the organophosphorus ligand to the hydroformylation product is greater than or equal to 1.5.

17. The process as claimed in claim 1, wherein the hydroformylation reaction mixture has an aldehyde having from 5 to 17 carbon atoms as the hydroformylation product.

18. The process as claimed in claim 1, wherein the hydroformylation reaction mixture has an acyl phosphite or heteroacyl phosphite as an organophosphorus ligand.

19. The process as claimed in claim 1, wherein the hydroformylation reaction mixture has an organophosphorus ligand as a free ligand.

20. The process as claimed in claim 19, wherein the molar ratio of the aldehyde product to free ligand in the feed stream to the first membrane separation step is more than 10:1.

21. The process as claimed in claim 1, wherein the metal complex catalyst has rhodium as metal.

22. The process as claimed in claim 1, wherein a thermal separation step for separating off the hydroformylation product is carried out after a membrane separation step.

23. The process as claimed in claim 22, wherein the bottom product from the thermal separation step, which comprises high boilers and catalyst complex, is fed to a further membrane separation step in which part of the high boilers is separated off from the bottom product as permeate and the catalyst complex remaining in the retentate is at least partly recirculated to the reactor.

24. The process as claimed in claim 21, wherein the total retention of complex catalyst in the process comprising at least one first membrane separation step, at least one thermal separation step and, optionally, at least one subsequent membrane separation step is more than 98%.

25. The process as claimed in claim 1, wherein controlling a carbon monoxide partial vapor pressure of at least 200 kPa in the flow to the membrane, in the flow from the membrane and in the permeate, comprises feeding additional carbon monoxide during the membrane separation step.

* * * * *

UNITED STATES PATENT AND TRADEMARK OFFICE
CERTIFICATE OF CORRECTION

PATENT NO. : 8,226,829 B2
APPLICATION NO. : 12/088041
DATED : July 24, 2012
INVENTOR(S) : Klaus-Diether Wiese et al.

It is certified that error appears in the above-identified patent and that said Letters Patent is hereby corrected as shown below:

On the title page, Item (73), the Assignee's name is incorrect. Item (73) should read:

-- (73) Assignee: Evonik Oxeno GmbH, Marl (DE) --

Signed and Sealed this
Sixteenth Day of October, 2012

David J. Kappos
*Director of the United States Patent and Trademark Office*